United States Patent [19]

Segalowitz et al.

[11] Patent Number: 4,910,944
[45] Date of Patent: Mar. 27, 1990

[54] APPARATUS FOR BANDING A STACK OF ENVELOPES

[75] Inventors: Ivar R. Segalowitz, Great Neck; Horacio A. Truffa, Elmhurst, both of N.Y.

[73] Assignee: J.A.D. Enterprises, Inc., New York, N.Y.

[21] Appl. No.: 336,686

[22] Filed: Apr. 12, 1989

[51] Int. Cl.$^4$ .............................................. B65B 27/08
[52] U.S. Cl. ........................................ 53/586; 53/582
[58] Field of Search ................ 53/586, 589, 590, 582, 53/580, 399, 397, 176, 528

[56] References Cited

U.S. PATENT DOCUMENTS

| | | | |
|---|---|---|---|
| 3,279,146 | 10/1966 | Ficht | 53/586 |
| 4,406,728 | 9/1983 | Ohba et al. | 53/582 X |
| 4,578,933 | 4/1986 | Lang et al. | 53/589 |
| 4,782,648 | 11/1988 | Van Ottele | 53/586 X |

Primary Examiner—James F. Coan
Attorney, Agent, or Firm—Cobrin, Feingertz & Gittes

[57] ABSTRACT

Apparatus for banding a stack of envelopes includes an elevator mechanism which moves the stack in a path between a first lowermost position to a second uppermost position; first and second tensioning units for applying a tensioning force to a first banding strap positioned across the path at a first location between the first and second positions and extending in a first longitudinal direction; first and second sealing and separating units for wrapping, sealing and separating opposite ends of the first elastic banding strap about the stack of envelopes when the elevator mechanism has moved the stack of envelopes past the first location; third and fourth tensioning units for applying a tensioning force to a second elastic banding strap positioned across the path at a second location between the first and second positions and extending in a second widthwise direction substantially transverse to said first longitudinal direction; third and fourth sealing and separating units for wrapping, sealing and separating opposite ends of the second elastic banding strap about the stack of envelopes when the elevator mechanism has moved the stack of articles past the second location; and a tipping device for tipping the elevator mechanism at its second uppermost position to discharge the banded envelopes.

37 Claims, 15 Drawing Sheets

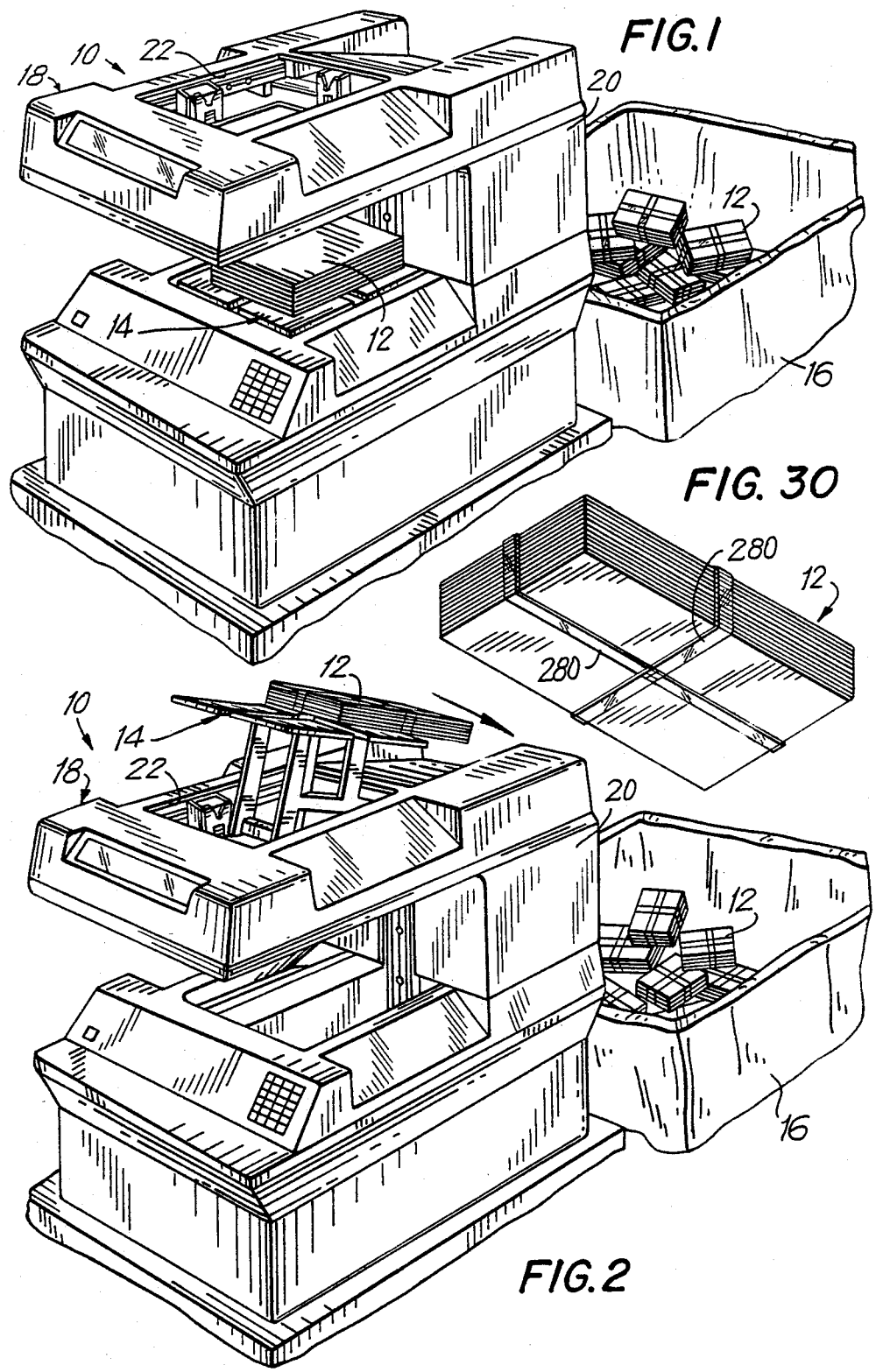

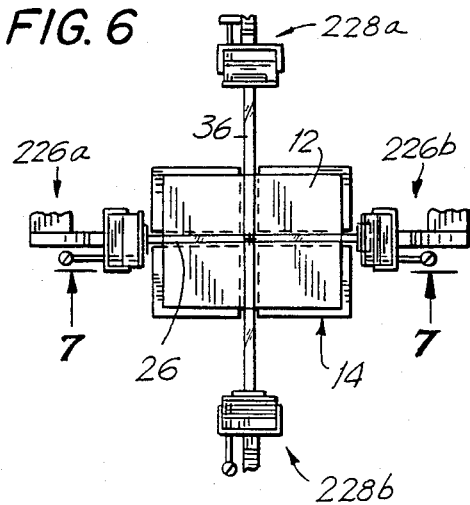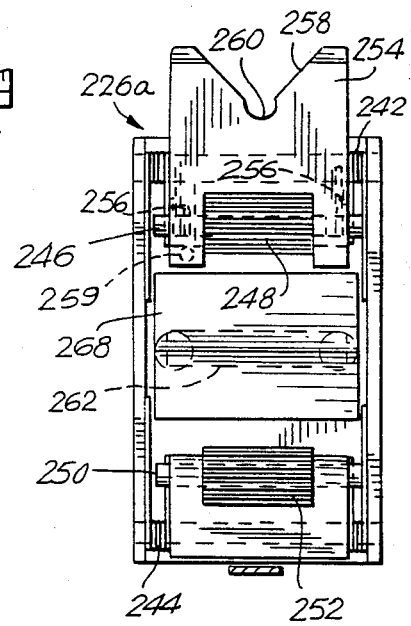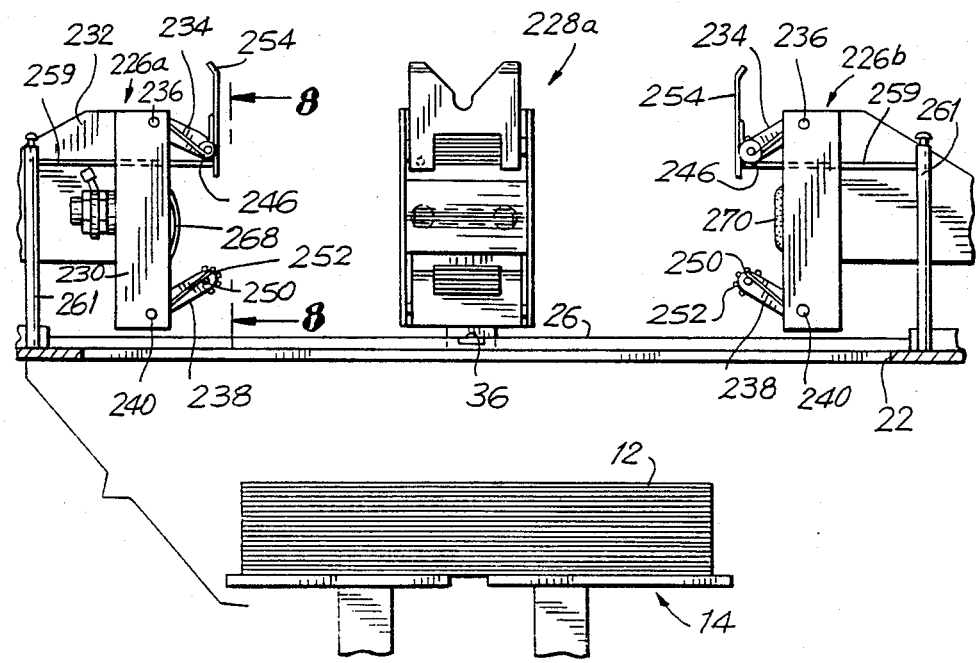

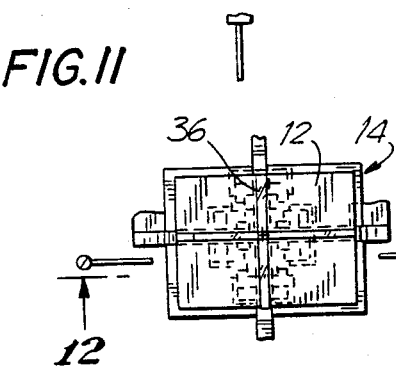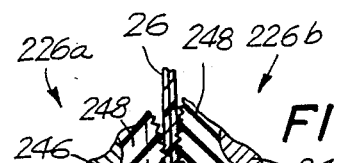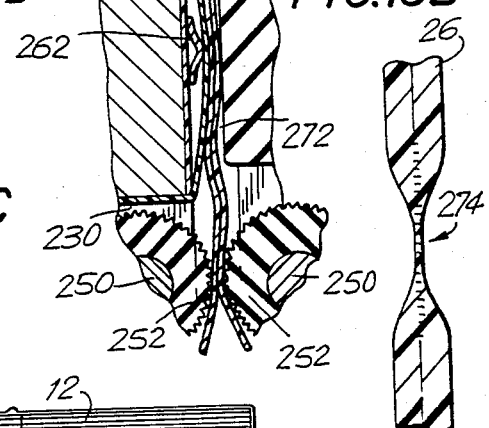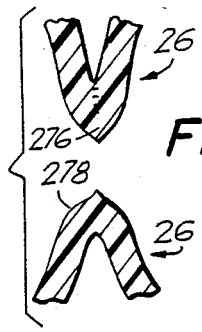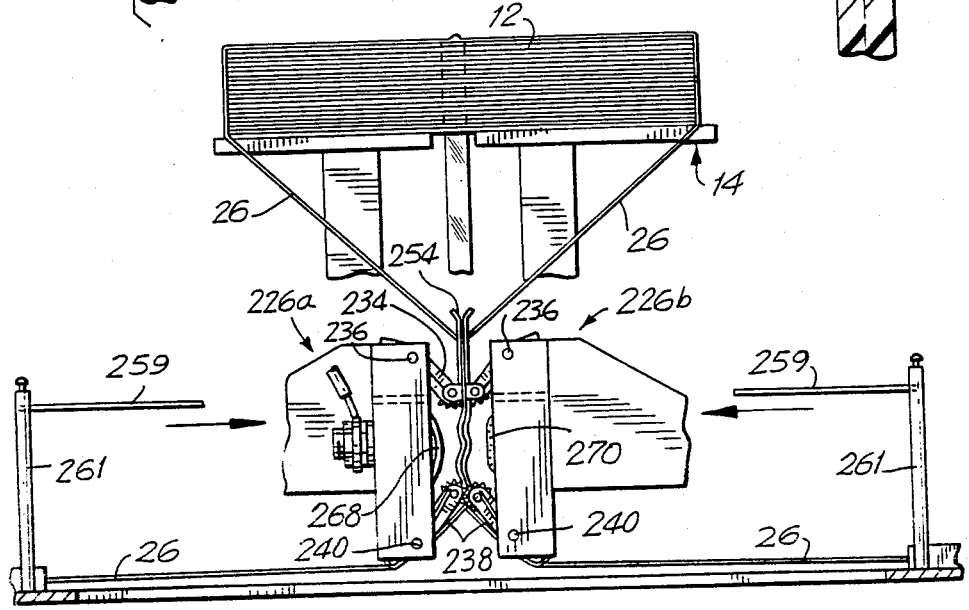

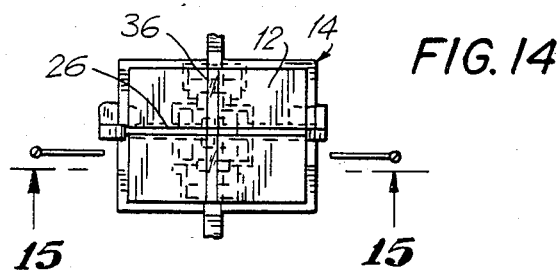
FIG. 14
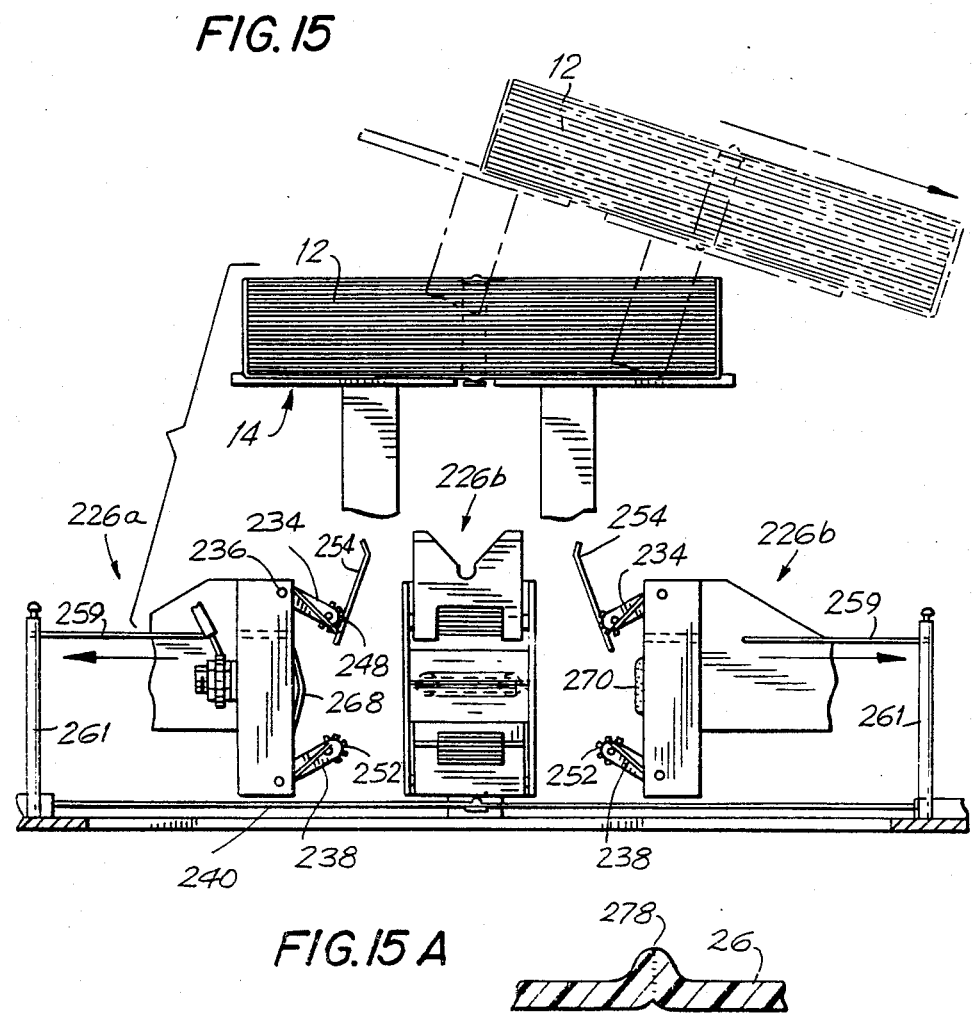
FIG. 15
FIG. 15A

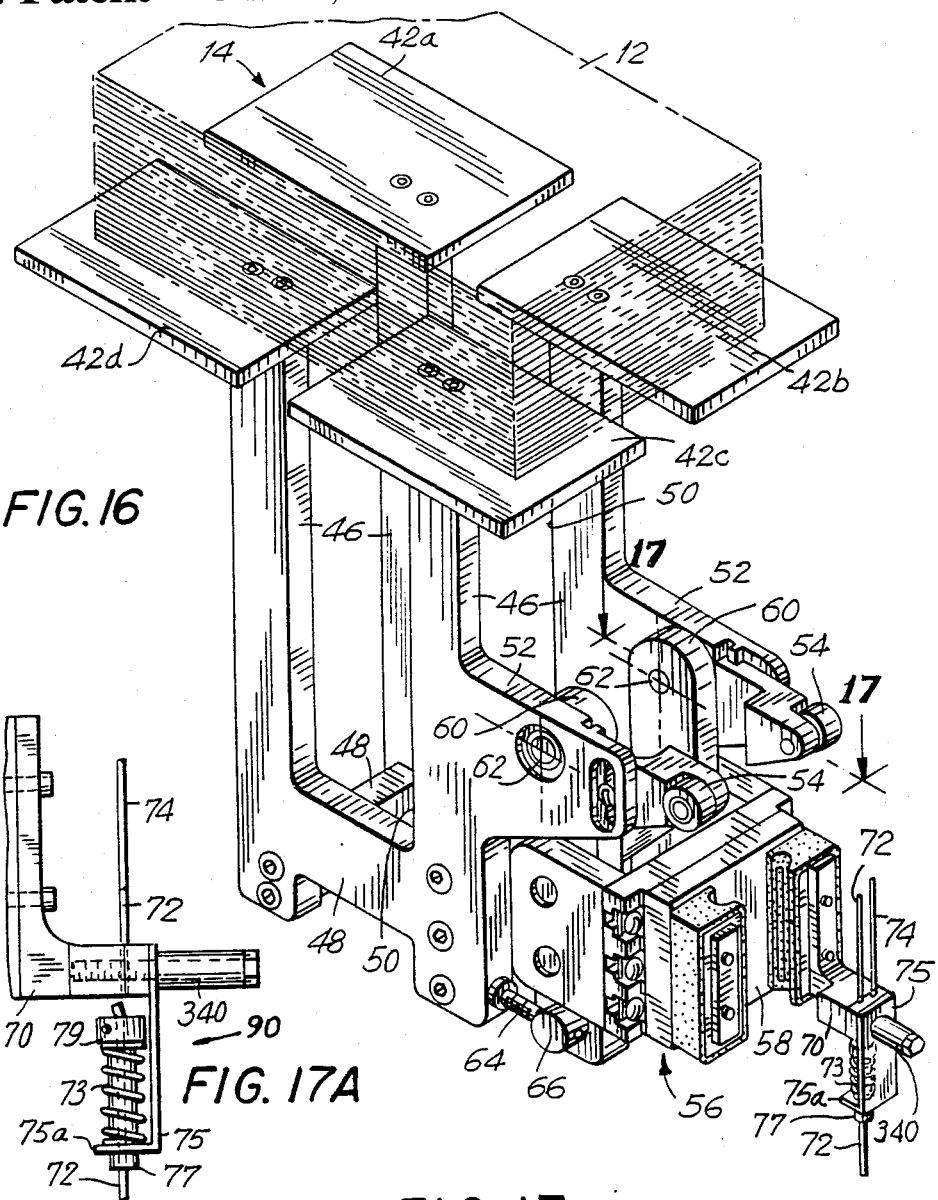

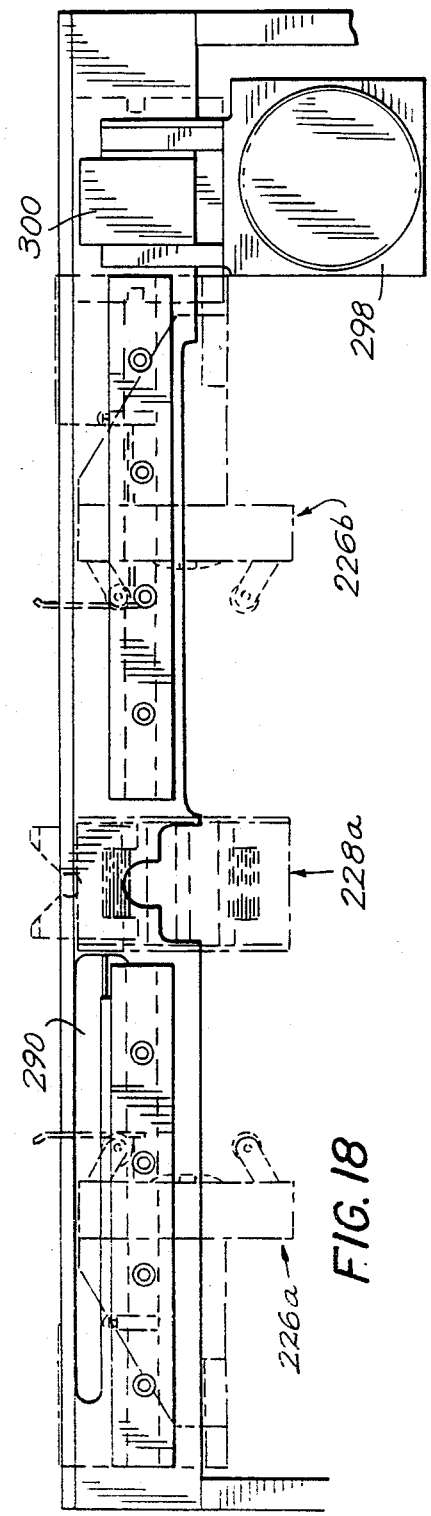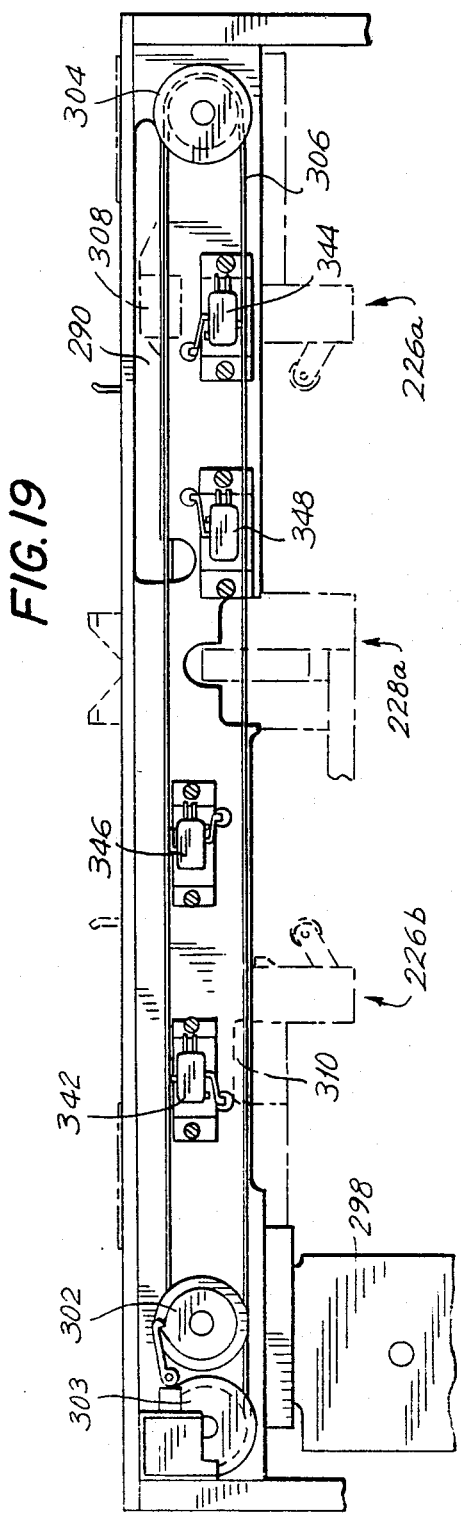

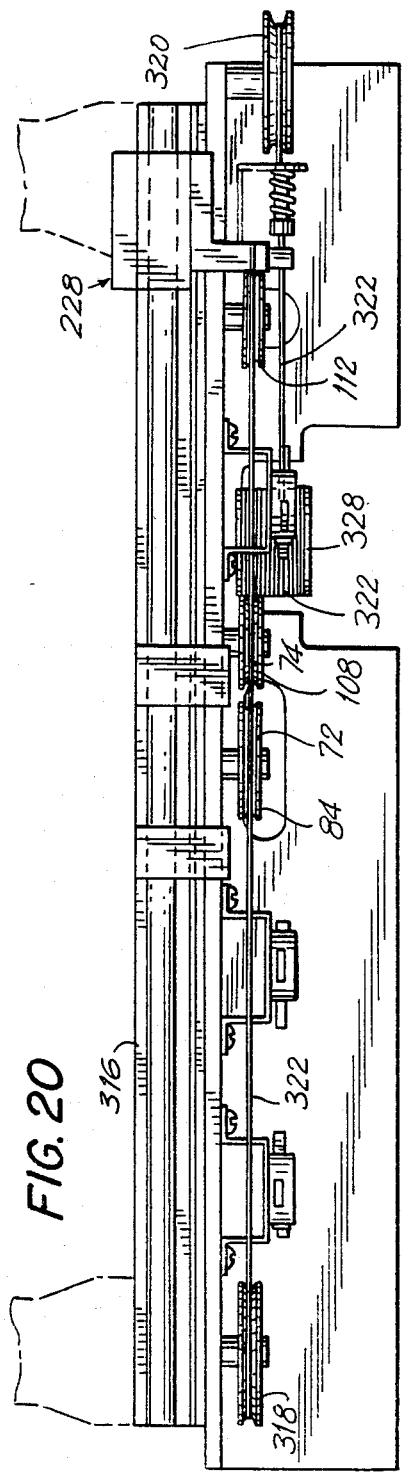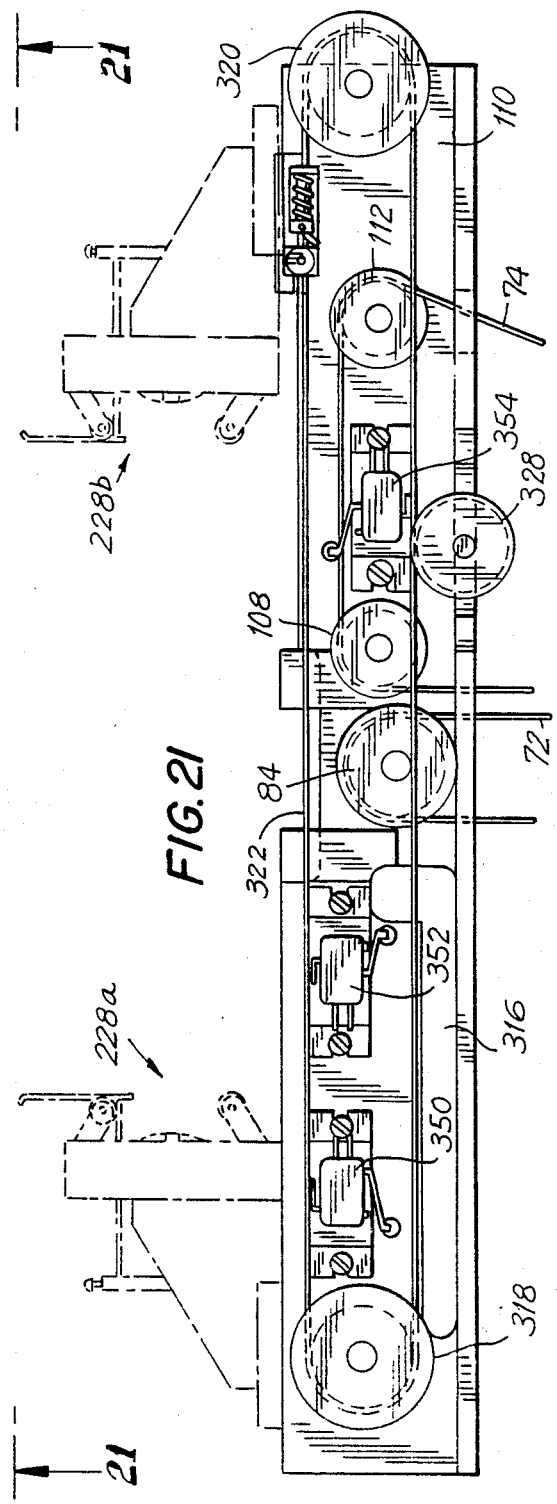

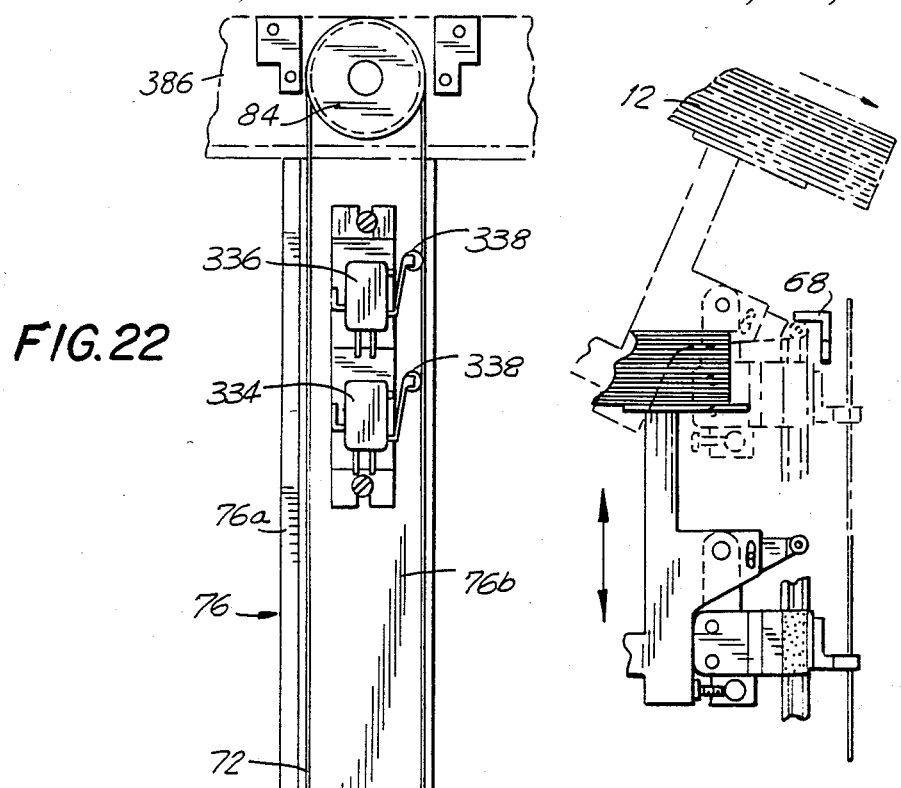
FIG. 22
FIG. 23
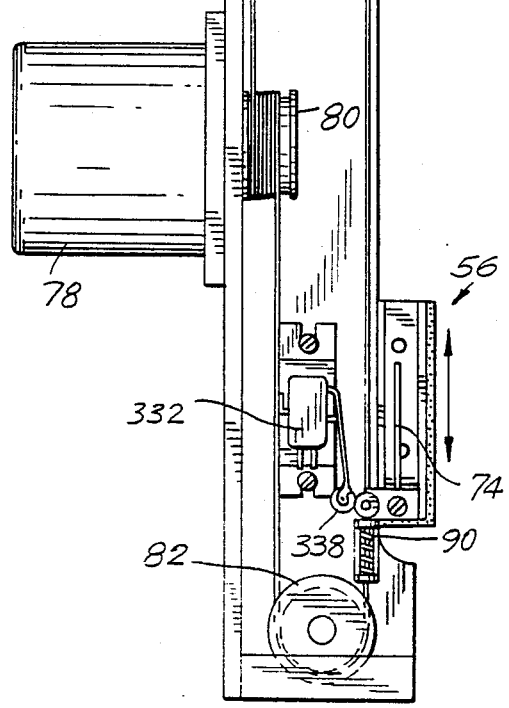

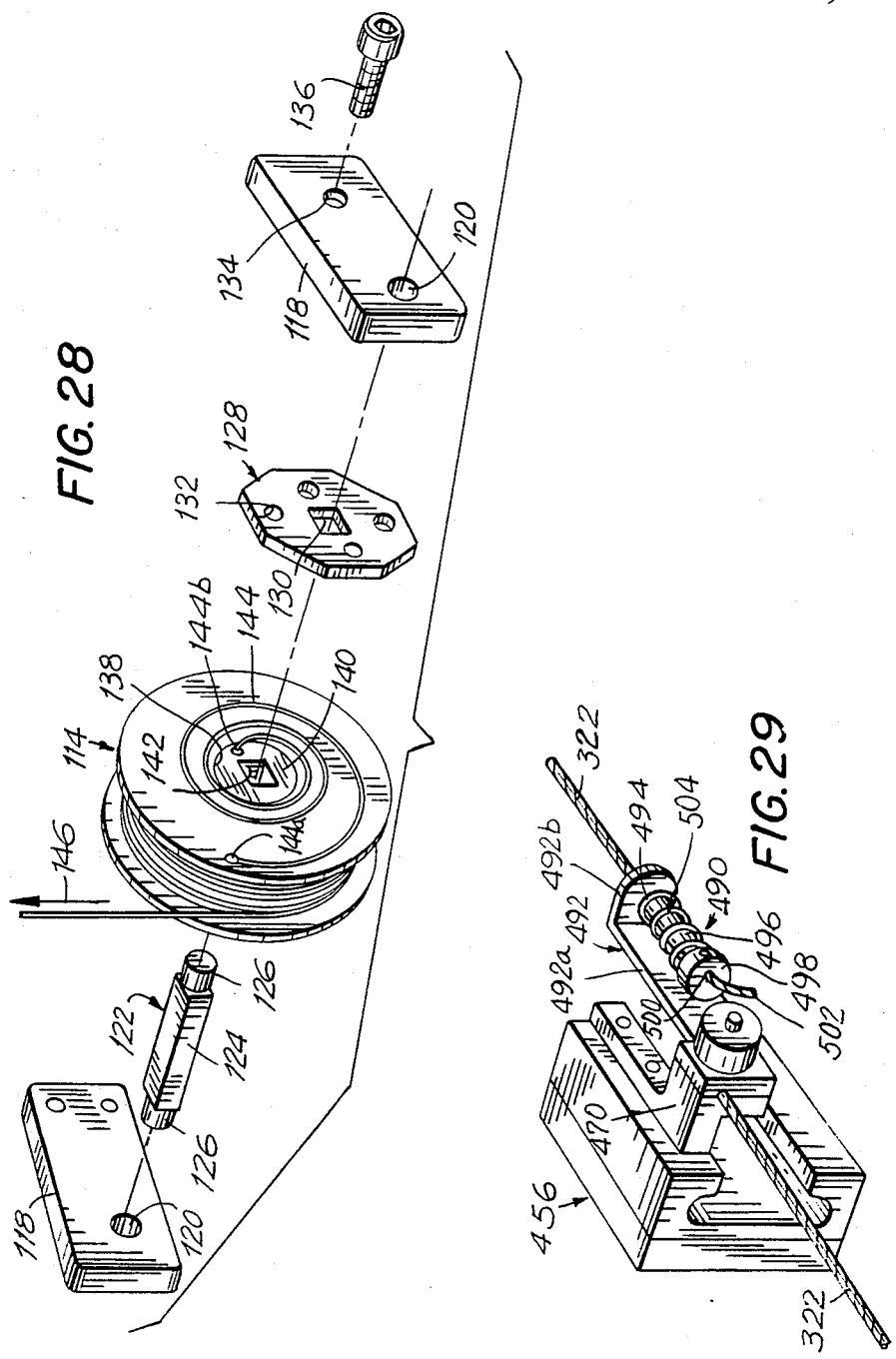

APPARATUS FOR BANDING A STACK OF ENVELOPES

BACKGROUND OF THE INVENTION

This invention relates generally to the bundling of envelopes, and more particularly, is directed to apparatus for automatically banding a stack of envelopes.

In order to reduce mailing costs, for example, for bulk rate mail, the U.S. Post Office requires that stacks of envelopes be sorted as to zip code and bundled. For a large mailing, these envelopes can easily be sorted and/or printed in accordance with the zip codes so as to sort the same. However, bundling of the stacks of envelopes has generally been performed manually by stretching rubber bands about the stacks of envelopes. This, however, is disadvantageous for two reasons. First, the manual stretching of rubber bands about the stacks of envelopes takes considerable time and labor, and is therefore cost inefficient. Secondly, the conventional rubber bands that are used tend to bite into the edges of the envelopes, oftentimes tearing the same. In addition, those persons who used conventional rubber bands frequently complained of carpal tunnel syndrome.

There are presently some machines that perform such banding operations. However, such machines are very slow and therefore also cost inefficient. Specifically, such machines are tie machines in which the stack of envelopes is rotated so that the tie can be made in two transverse directions. Further, the tie used is twine or polyester rope which bites into the edge of the envelopes. Strapping machines have also been used with a nylone strap. However, such strap is a relatively stiff material that tends to damage the envelopes and envelopes bundled in this manner are not acceptable to the U.S. Post Office.

OBJECTS AND SUMMARY OF THE INVENTION

Accordingly, it is an object of the present invention to provide apparatus for banding a stack of envelopes that overcomes the aforementioned problems with the prior art.

It is another object of the present invention to provide apparatus for banding a stack of envelopes automatically.

It is still another object of the present invention to provide apparatus for banding a stack of envelopes in a reduced time period.

It is yet another object of the present invention to provide apparatus for banding a stack of envelopes in which the size of the elastic banding straps used for bundling the envelopes is automatically adjusted to the size of the bundle.

It is a further object of the present invention to provide apparatus for banding a stack of envelopes in which the elastic banding straps do not bite into edges of the envelopes.

In accordance with an aspect of the present invention, apparatus for banding a stack of articles includes elevator means for moving the stack of articles in a path from a first position to a second position; first tensioning means for applying a tensioning force to a first banding strap positioned across the path at a first location between the first and second positions and extending in a first direction; first sealing and separating means for wrapping, sealing and separating opposite ends of the first elastic banding strap about the stack of articles when the elevator means has moved the stack of articles past the first location; second tensioning means for applying a tensioning force to a second elastic banding strap positioned across the path at a second location between the first and second positions and extending in a second direction substantially transverse to the first location; and second sealing and separating means for wrapping, sealing and separating opposite ends of the second elastic banding strap about the stack of articles when the elevator means has moved the stack of articles past the second location.

The above and other objects, features and advantages of the present invention will become readily apparent from the following detailed description which is to be read in connection with the accompanying drawings.

BRIEF DESCRIPTION OF THE DRAWINGS

FIG. 1 is a perspective view of banding apparatus according to one embodiment of the present invention with the elevator in its lowermost position;

FIG. 2 is a perspective view of the banding apparatus of FIG. 1 with the elevator in its uppermost tilted position;

FIG. 6 is a top plan view of the elevator and sealing and separating units when the elevator is in its lowermost position;

FIG. 7 is a cross-sectional view of the assembly of FIG. 6, taken along line 7—7 thereof;

FIG. 8 is a cross-sectional view of the assembly of FIG. 7, taken along line 8—8 thereof;

FIG. 11 is a top plan view of the elevator and sealing and separating units of FIG. 9, with the elevator at the same position shown in FIG. 9, but with two sealing and separating units moved toward each other;

FIG. 12 is a cross-sectional view of the assembly of FIG. 11, taken along line 12—12 thereof;

FIG. 13A is a longitudinal cross-sectional view of a portion of the assembly of FIG. 12, taken along the sealing and separating units thereof;

FIG. 13B is a cross-sectional view of the sealed ends of the banding strap of FIG. 13A, showing a weakened, reduced thickness area thereof;

FIG. 13C is a cross-sectional view similar to that of FIG. 13B, showing the weakened area torn;

FIG. 14 is a top plan view of the elevator with the bundled envelopes thereon in its uppermost position;

FIG. 15 is a cross-sectional view of the assembly of FIG. 14, taken along line 15—15 thereof;

FIG. 15A is a cross-sectional view, showing the connected ends of the lower portion of the banding strap of FIG. 13B;

FIG. 16 is a perspective view of the elevator and tilting mechanism for the same;

FIG. 17 is a cross-sectional view of the assembly of FIG. 16, taken along line 17—17 thereof;

FIG. 17A is a side elevational view of a portion of the elevator assembly, showing the counterweight tensioning cable and lift cable secured thereto;

FIG. 18 is a side elevational view of a long beam and two sealing and separating units carried thereby;

FIG. 19 is an opposite side elevational view of the long beam and sealing and separating units of FIG. 18;

FIG. 20 is a top plan view of a short beam for carrying the other two sealing and separating units;

FIG. 21 is a side elevational view of the short beam of FIG. 20;

FIG. 22 is a side elevational view of the drive mechanism for moving the elevator between its lowermost and uppermost positions, along with switching devices for activating the sealing and separating units and elevator drive mechanism;

FIG. 23 is a side elevational view showing the tipping of the elevator at its uppermost position;

FIG. 28 is an exploded perspective view of a portion of the counterweight assembly of FIG. 24;

FIG. 29 is a perspective view of a portion of the transverse tensioning device; and FIG. 30 is a perspective view of a bundled stack of envelopes.

DETAILED DESCRIPTION OF A PREFERRED EMBODIMENT

Figure 3:
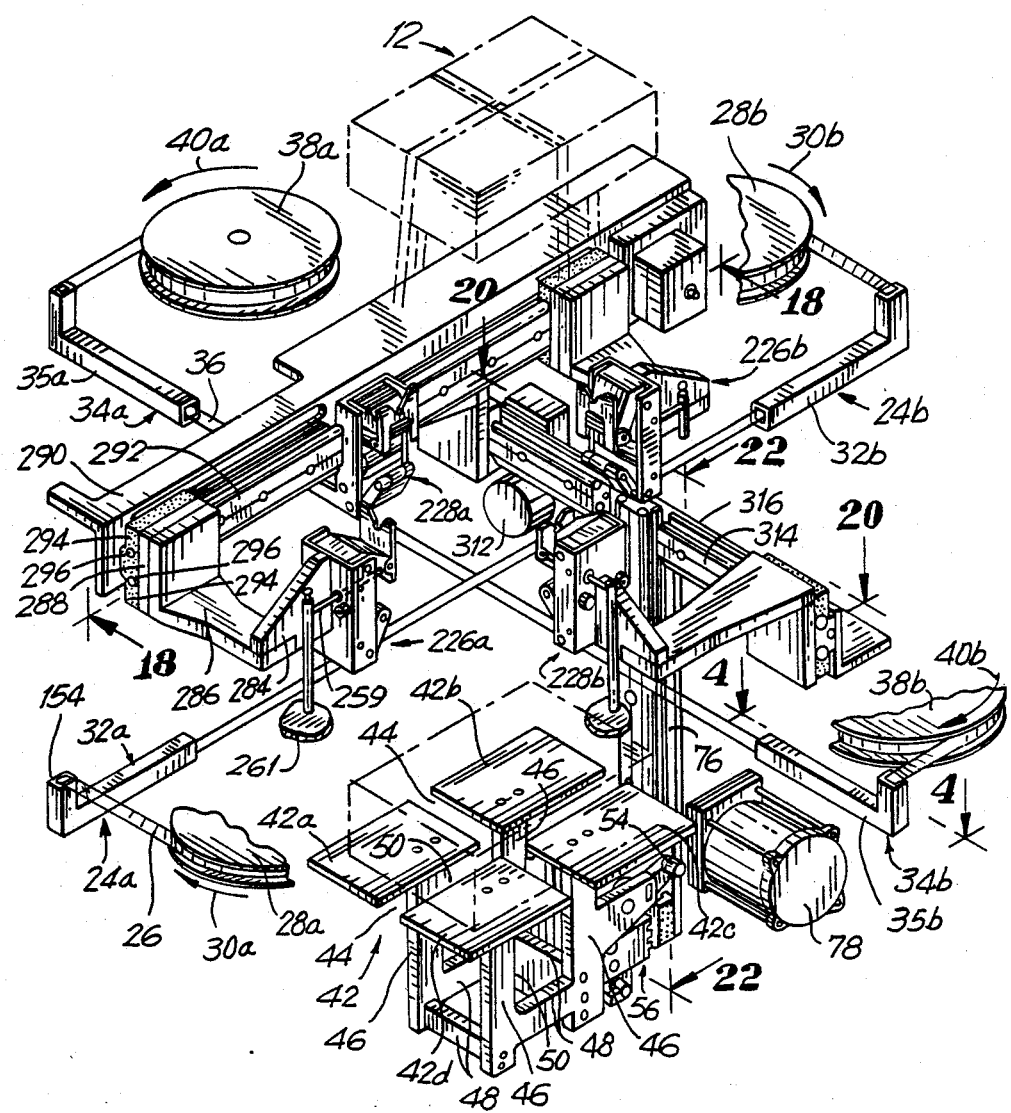
FIG. 3 is a perspective view of the main operating components of the banding apparatus of FIG. 1.

Referring to the drawings in detail, banding apparatus 10 for banding a stack of envelopes is shown generally in FIG. 1. As shown therein, stack of envelopes 12 is positioned on an elevator mechanism 14 which is shown in its lowermost position. The stack of envelopes 12 can be deposited thereon by any suitable means such as a conveyor assembly or the like (not shown), and which is conventional. Elevator mechanism 14 is adapted to be moved from the lowermost position shown in FIG. 1 to an uppermost titled position shown in FIG. 2. As will be appreciated from the discussion hereinafter, in the uppermost tilted position of FIG. 2, the stack of envelopes 12 has been banded (FIG. 30) and then merely slides off elevator mechanism 14 into a hopper 16. It will be appreciated from the above, that the mechanisms for banding the stack of envelopes 12 is positioned in a hood 18 positioned directly above elevator mechanism 14 when the latter is in its lowermost position.

As shown in FIGS. 1 and 2, hood 18 is supported in a cantilevered manner by means of an end support 20. Hood 18 includes a central opening 22 through which the stack of envelopes 12 can be vertically raised by elevator mechanism 14, and the banding mechanisms, to be described hereinafter, are positioned in surrounding relation to opening 22 in hood 18.

As shown in FIG. 3, banding apparatus 10 includes first lengthwise tensioning units 24a and 24b located on opposite sides of opening 22 in hood 18 and which apply a predetermined amount of tension to a lengthwise elastic banding strap 26. Specifically, lengthwise elastic banding strap 26 has opposite ends thereof wound on reels 28a and 28b, respectively, which are located adjacent to opposite lengthwise tensioning units 24a and 24b. Thus, lengthwise elastic banding strap 26 extends from reel 28a, through first lengthwise tensioning unit 24a, lengthwise across opening 22, through second lengthwise tensioning unit 24b and then onto reel 28b. Tensioning units 24a and 24b apply a predetermined amount of tension to lengthwise banding strap 26 extending across opening 22, while permitting additional amounts of banding strap 26 to be unwound from reels 28a and 28b, as indicated by arrows 30a and 30b upon the application of an external pulling force on lengthwise banding strap 26 extending through opening 22. It will be noted that lengthwise tensioning units 24a and 24b are positioned in L-shaped outer housings 32a and 32b, respectively.

In like manner, widthwise tensioning units 34a and 34b are provided in hood 18 on the remaining opposite sides of rectangular opening 22 thereof within outer housings 35a and 35b, respectively, and are substantially identical to lengthwise tensioning units 24a and 24b. Again, a widthwise elastic banding strap 36 extends in a tensioned state across opening 22 in a direction substantially transverse to that of lengthwise banding strap 26. Thus, one end of widthwise banding strap 36 is wound about a reel 38a while the opposite end is wound about a reel 38b positioned on opposite sides of hood 18. In this manner, widthwise banding strap extends from reel 38a, through widthwise tensioning unit 34a, widthwise across opening 22, through widthwise tensioning unit 34b and then onto reel 38b. Widthwise tensioning units 34a and 34b apply a predetermined amount of tension to widthwise banding strap 36 extending across opening 22. In this manner, when an external pulling force is imparted to widthwise banding strap 36 extending across opening 22, an additional amount of such banding strap 36 can be pulled from reels 38a and 38b, depending upon the external force applied and the tensioning force applied by widthwise tensioning units 34a and 34b. Preferably, lengthwise banding strap 26 and widthwise banding strap 36 which extend across opening 22 are at the same height, although the present invention is not limited thereby.

Banding strap 26 and 36 may be made of any suitable material, such as polyurethane, polyester, a polyester grade thermoplastic elastomer such as PS7010 or the like. Any other suitable material can be used, as long as it has the qualities of heat sealability, good elasticity and being sufficiently strong.

With the invention thus far described, as elevator mechanism 14 moves the stack of envelopes 12 upwardly through opening 22, stack of envelopes 12 abuts against and biases banding straps 26 and 36 upwardly, thereby pulling additional banding strap material from reels 28a, 28b, 38a and 38b in the direction of arrows 30a, 30b, 40a and 40b, respectively. As elevator mechanism 14 continues moving upwardly, banding straps 26 and 36 are thereby draped over and extend along the sides of stack of envelopes 12 in a tensioned state.

In this regard, it will be noted that elevator mechanism includes a platform 42 formed by four platform sections 42a–42d, each platform section 42a–42d having a rectangular configuration and the entire platform 42 also having a rectangular configuration. It will be appreciated that platform sections 42a-42d are separated from each adjacent platform section by a small gap 44 to permit entry of banding straps 26 and 36 therethrough so that such straps 26 and 36 can be draped over stack of envelopes 12.

As shown best in FIGS. 3 and 16, each platform section 42a-42d is mounted on top of a vertical support post 46 and vertical support posts 46 are connected at their lower ends by transverse beams 48. Accordingly, a side opening 50 is defined by each adjacent pair of vertical support posts 46, a respective transverse beam 48 and two of the platform sections 42a-42d supported on the respective vertical support posts 46.

As shown in FIG. 16, two arms 52 extend transversely from vertical support posts 46 that support platform sections 42b and 42c. Cam rollers 54 are rotatably supported at the free ends of arms extension arms 53 (FIG. 17) which in turn are connected with arms 52.

Elevator mechanism 14 is pivotally mounted on an elevator drive support 56, as best shown in FIG. 16. Specifically, elevator drive support 56 includes a main body 58 having two upstanding arms 60, and a central portion of each arm 52 is pivotally mounted on the upper end of a respective upstanding arm 60 by means of a pivot pin 62. It will be appreciated that elevator mechanism 14 is limited in its counterclockwise direction, as viewed in FIG. 16, by respective stop pins 64 and 66 on elevator mechanism 14 and elevator drive support 56, respectively, such that platform 42 is normally maintained in a horizontal orientation by means of the weight of elevator mechanism 14. However, elevator mechanism 14 can pivot about pivot pins 62 in the clockwise direction of FIG. 16 when cam rollers 54 hit a stationary projection 68 (FIG. 23) in the uppermost position thereof so as to tilt elevator mechanism 14 in the clockwise direction, as shown in FIG. 2.

In order to drive elevator mechanism 14 in the vertical direction, elevator drive support 56 includes an outwardly extending cable support 70 secured thereto. An elevator lift cable 72 and a tensioning or counterweight cable 74 are secured to cable support 70.

Specifically, as shown in FIG. 22, apparatus 10 includes an L-shaped vertical beam 76 having one vertical leg 76a and a second vertical leg 76b. An elevator drive motor 78 is mounted to vertical leg 76a and has an output shaft (not shown) extending through an aperture therein. A winding drum 80 is mounted to the output shaft of elevator drive motor 78 so as to be rotated thereby. A first pulley 82 is rotatably mounted to the inner face of vertical leg 76b and an upper pulley 84 is rotatably mounted to a short beam 316 secured to the upper end of vertical leg 76b. Elevator lift cable 72 is wound about winding drum 80, with one end extending about upper pulley 84 and back down so as to be secured to cable support 70 of elevator drive support 56. The opposite end of cable 72 extends from winding drum 80, down about pulley 82 and up to a cable tensioning mechanism 90 which is best shown in FIGS. 16 and 17A.

Basically, cable tensioning mechanism 90 includes an L-shaped plate 75 having a vertical leg and a horizontal leg 75a. An aperture (not shown) is provided in horizontal leg 75a with a pin 77 slidable through the aperture. Pin 77 has an enlarged head 79 at the opposite end thereof so as to prevent escape of pin 77 through the aperture. Pin 77 and enlarged head 79 have a longitudinal bore (not shown) extending therethrough, such that elevator lift cable 72 extends therethrough and can be secured by a set screw extending through enlarged head 79. A coil spring 73 is wrapped about pin 77 and extends between enlarged head 79 and horizontal leg 75a so as to normally bias pin 77 away from horizontal leg 75a. Accordingly, cable tensioning mechanism 90 tends to take up any slack in elevator lift cable 72 and thereby maintain the latter in a taut condition.

With this arrangement, rotation of winding drum 80 by elevator drive motor 78 causes one portion of cable 72 to wind about drum 80 and another portion to unwind from drum 80, whereby the vertically oriented portion of cable 72 opposite to drum 80 is moved vertically up or down, depending upon the rotational direction of drum 80, thereby causing elevator mechanism 14 to likewise move in the vertical direction. It will be appreciated that, with the present invention, elevator mechanism 14 only moves a short distance, for example, approximately eight inches.

The present invention further includes a counterweight assembly 106 shown best in FIGS. 24-29. Specifically, counterweight assembly 106 includes the aforementioned tensioning cable 74 which is secured to cable support 70 of elevator drive support 56 and extends upwardly therefrom. As will now be described, tensioning cable 74 has a tension applied thereto in order to apply a counterweight to elevator mechanism 14 and elevator drive support 56 so that the latter elements are effectively weightless in regard to elevator drive motor 78. In other words, because of counterweight assembly 106, elevator drive motor 78 need only move the weight of stack of envelopes 12 on elevator mechanism 14. In this regard, tensioning cable 74 extends upwardly about a first upper pulley 108 secured to short beam 316, and over to a second pulley 112 also rotatably mounted on short beam 316 and then down about a winding drum 114 which is rotatably mounted to a vertical support 116.

Figure 24:
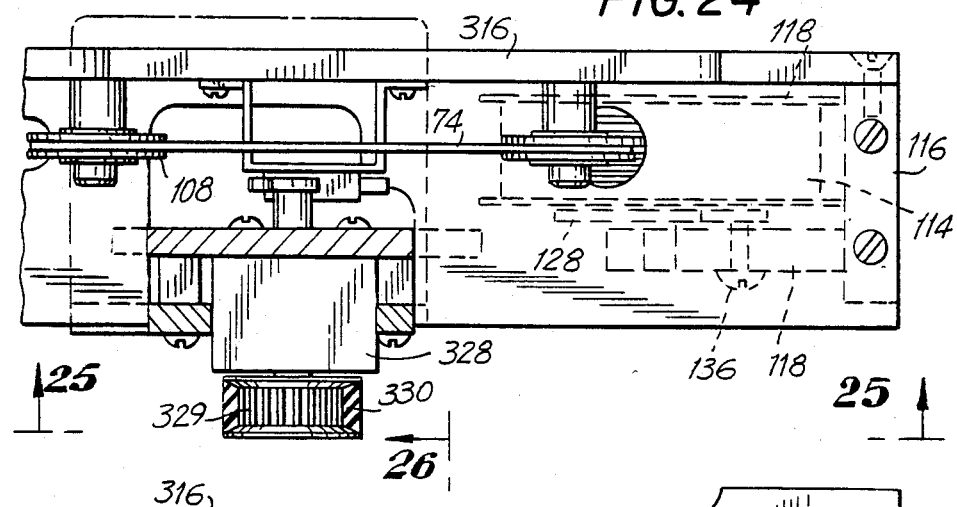
FIG. 24 is a top plan view of a portion of the short beam of FIG. 20, showing the drive for two opposite sealing and sealing units and a portion of the counterweight assembly for the elevator.
Figure 25:
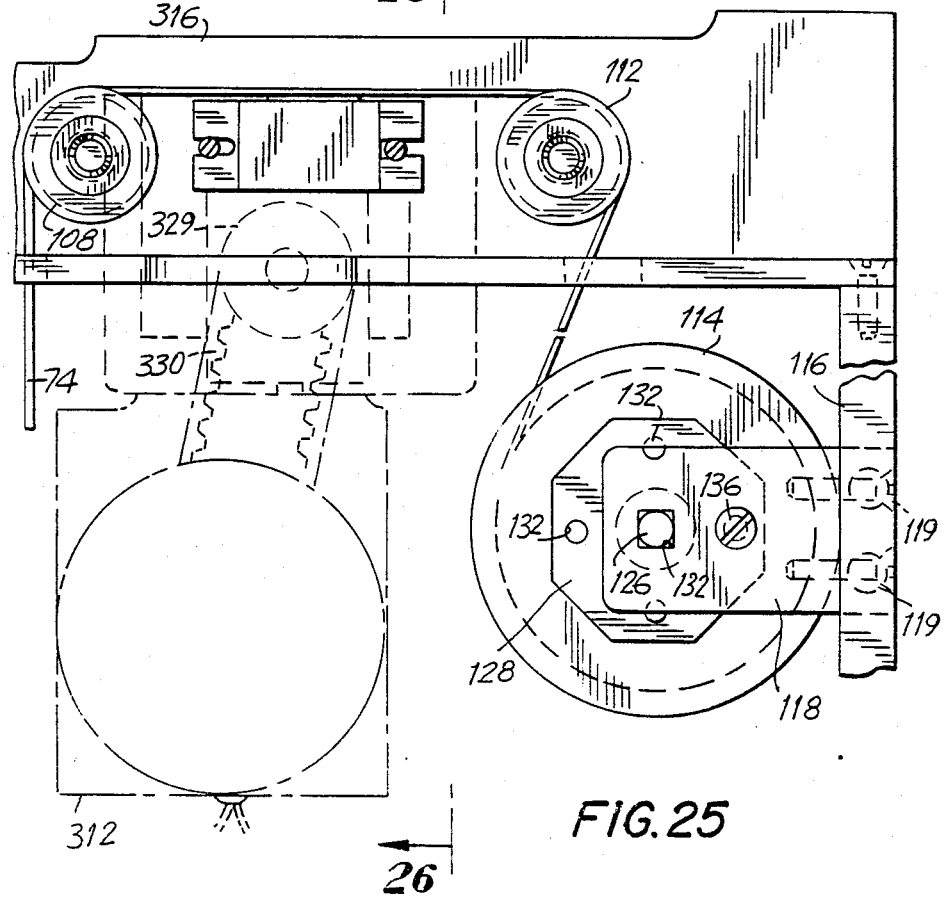
FIG. 25 is a cross-sectional view of the assembly of FIG. 24, taken along line 25—25 thereof.
Figure 27:
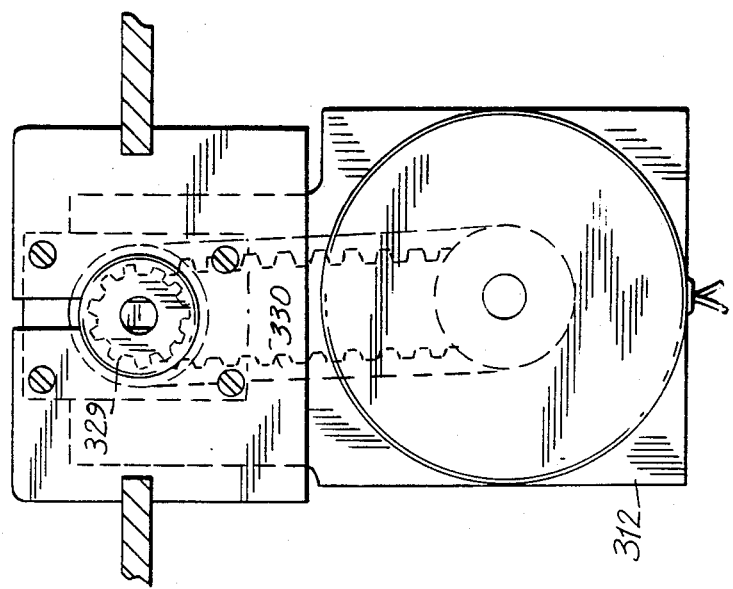
FIG. 27 is a cross-sectional view of the assembly of FIG. 26, taken along line 27—27 thereof.
Figure 26:
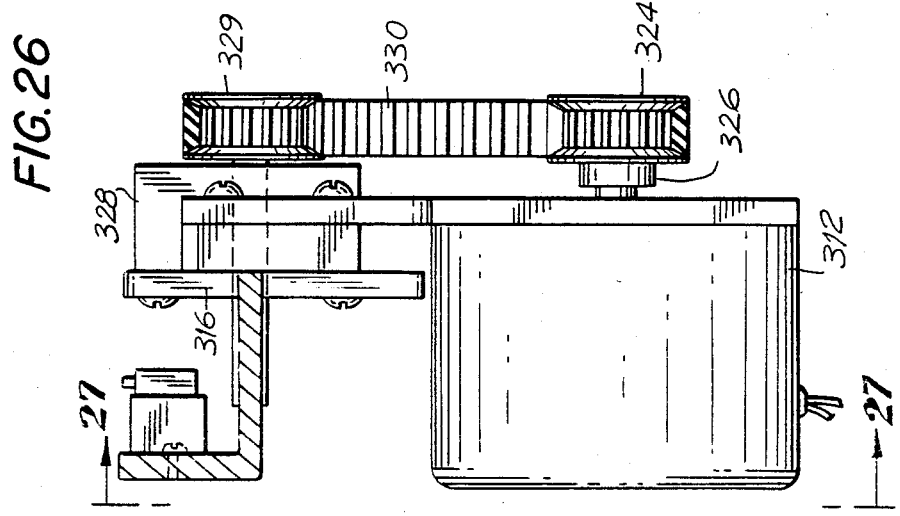
FIG. 26 is a cross-sectional view of the assembly of FIG. 25, taken along line 26—26 thereof.

As shown in FIGS. 24, 25 and 28, two arms 118 are secured to vertical support 116 in parallel, spaced relation by means of bolts 119, each arm 118 having a pivot aperture 120 at the free end thereof. A pin 122 having a square cross-sectional main body 124 and opposite cylindrical ends 126 is positioned between arms 118 such that opposite cylindrical ends 126 are rotatably mounted within pivot apertures 120 of arms 118. In addition, an octagonal plate 128 having a square central aperture 130 and four equiangularly displaced peripheral apertures 132, is positioned adjacent one plate 118 which has a screw-threaded aperture 134. A bolt 136 is screw-threadedly received within aperture 134 and then into one of peripheral apertures 132 so as to prevent rotation of octagonal plate 128. As a result, since main body 124 of pin 122 fits within square central aperture 130 of octagonal plate 128, pin 122 is rendered non-rotatable.

Winding drum 114 includes a central circular aperture 138 and a cylindrical shaft 140 is inserted therein such that winding drum 114 is rotatably mounted on cylindrical shaft 140. As shown in FIG. 28, cylindrical shaft 140 includes a central square through bore 142 which receives square cross-sectional main body 124 of pin 122. Because pin 122 is non-rotatable, cylindrical shaft 140 is also rendered non-rotatable, although winding drum 114 is rotatably mounted on cylindrical shaft 140. A coil spring 144 is wound about drum 114 and has one end 144a secured to a flange of winding drum 114 and the opposite end 144b secured to cylindrical shaft 140. Accordingly, as winding drum 114 is rotated to unwind tensioning cable in the direction of arrow 146, spring 144 is tightened.

Basically, spring 144 has a substantially constant spring force applied to winding drum 114 throughout the entire short traveling distance of elevator platform 14 so as to apply a substantially constant counterweight to elevator platform 14. In other words, the counterweight applied by the spring force of coil spring 144 is substantially the same at the lowermost and uppermost positions of elevator platform 14. As a result, the force of spring 144 counteracts the weight of elevator mechanism 14 so that motor 78 effectively only drives the stack of envelopes 12.

Accordingly, with the invention thus far described, elevator platform 14 is caused to move from its lowermost to its uppermost position, and during such travel, banding straps 26 and 36 are draped over and down stack of envelopes 12 and extend through gaps 44 between platform sections 42a–42d.

Figure 4:
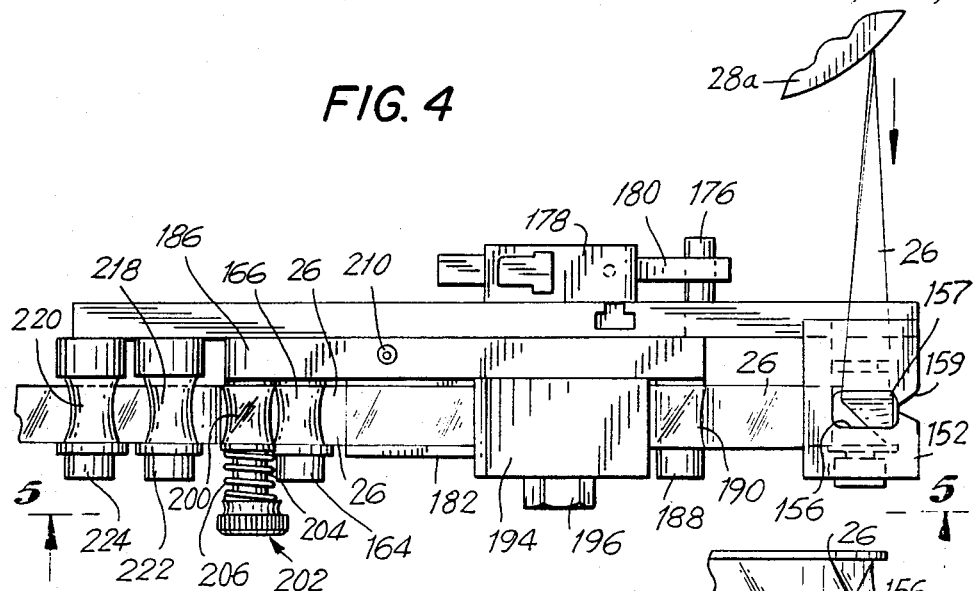
FIG. 4 is a top plan view of the operative components of one of the tensioning units which tensions a banding strap.
Figure 5:
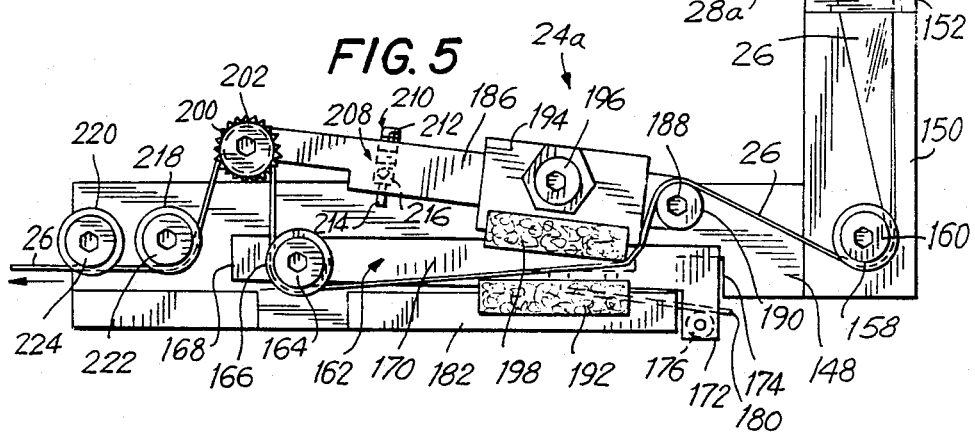
FIG. 5 is a side elevational view of the tensioning unit of FIG. 4 when there is no tension on the banding strap.
Figure 5A:
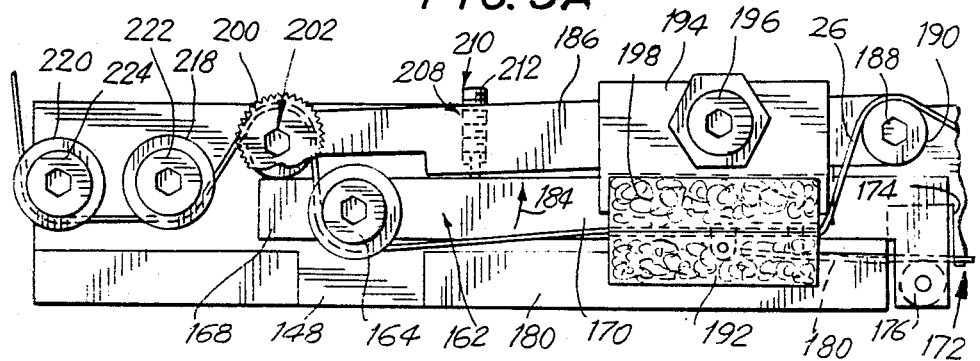
FIG. 5A is a side elevational view of tensioning unit of FIG. 5 when there is tension on the banding strap.
Figure 9:
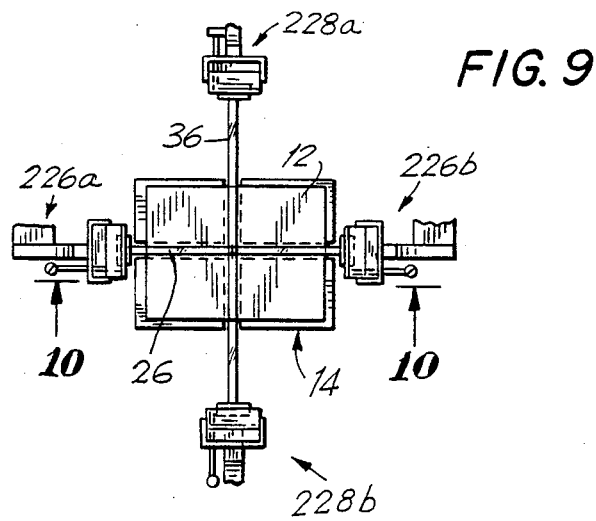
FIG. 9 is a top plan view of the elevator and sealing and separating units of FIG. 7, when the elevator is in a raised position above the sealing and separating units.

Referring now to FIGS. 4, 5 and 5A, tensioning unit 24a within outer housing 32a will now be described in detail, with the understanding that each of the remaining tensioning units are constructed in an identical manner. Specifically, tensioning unit 24a includes a horizontal plate 148 and a vertical plate 150 connected at one end of horizontal plate 148 and extending upwardly therefrom. Thus, tensioning unit 24a has a substantially L-shaped configuration. A horizontal guide plate 152 is secured to the upper end of vertical plate 150 and is positioned at the opening 154 (FIG. 3) of outer housing 32a. A substantially rectangular guide opening 156 is formed in guide plate 152, with guide opening 156 being connected to the outside through a small slit 157 that terminates in a V-shaped opening 159 in order to permit entry of banding strap 26 into guide opening 156, as best shown in FIG. 4. With this arrangement, banding strap 26 extending from reel 28a is twisted 90 degrees and guided along one edge of guide opening 156 and from guide opening 156, banding strap 26 extends vertically down in FIG. 5 and about a stationery guide roller 158. It will be appreciated that the bolt 160 used to secure stationery guide roller 158 to the lower end of vertical plate 150 is also used to secure vertical plate 150 to horizontal plate 148. It will further be appreciated, as shown best in FIG. 5, that banding strap 26 undergoes another 90 degree rotation from guide opening 156 to its position about stationery guide roller 158.

Tensioning unit 24a further includes a switch lever 162 which is pivotally secured to horizontal plate 148 by means of a bolt 164. A guide roller 166 is rotatably mounted on bolt 164. It will be noted that a pivoting portion 168 of switch lever 162 extends to the left of pivot bolt 164 in FIG. 5 with the remaining lever portion 170 extending to the right of pivot bolt 164. Lever portion 170 is formed in an L-shape so as to have a downturned leg 172 extending from the free end thereof to a position below the lower edge of horizontal plate 148. As shown best in FIG. 5, a rectangular groove 174 is cut out at the bottom edge of horizontal plate 148 in line with downturned leg 172, the reason for which will become apparent from the description which follows. A switch actuating rod 176 is secured to the rear surface at the free end of downturned leg 172 and extends rearwardly of horizontal plate 148 so that it can travel within groove 174 during pivotal movement of switch lever 162. An electrical switch 178 is secured to the rear face of horizontal plate 148 and has a switch arm 180 extending therefrom into contact with the free end of switch actuating rod 176. Switch arm 180 is spring biased downwardly by conventional biasing means (not shown) so as to normally bias switch lever 162 in the clockwise direction of FIG. 5. However, horizontal plate 148 includes a base section 182 extending forwardly at the lower end thereof for limiting clockwise pivotal movement of switch lever 162. As will be described in greater detail hereinafter, when there is no tension on banding strap 26, as shown in FIG. 5, switch lever 162 is biased by switch arm 180 against base section 182. In such case, switch 178 activates an alarm (not shown) and thereby shuts down the operation until an operator properly adjusts the tension. If there is tension on banding strap 26, as shown in FIG. 5A, pivoting portion 168 of switch lever 162 is biased downwardly so as to raise lever portion 170 in the counter-clockwise direction, as shown by arrow 184 in FIG. 5A, whereby switch actuating rod 176 actuates switch arm 180 to close switch 178 so that normal operation is continued.

The portion of tensioning unit 24a that controls the pivoting position of switch lever 162 will now be described. Specifically, an actuating lever 186 is pivotally secured to an upper portion of horizontal plate 148, slightly offset from downturned leg 172 by means of a pivot bolt 188. A guide roller 190 is rotatably mounted on pivot bolt 188.

As shown best in FIG. 5, a pad 192, such as a felt pad, is fixedly secured to base section 182 with the upper surface of pad 192 extending slightly above the upper surface of base section 182. In addition, a pad block 194 is secured to actuating lever 186 by a bolt 196 or the like and includes a pad 198, such as a felt pad, fixed to the lower surface thereof for engagement with pad 192 when actuating lever 186 is moved in the counter-clockwise direction to the position shown in FIG. 5A. In addition, a tensioning roller 200 is rotatably mounted at the free end of actuating lever 186 by means of a tensioning bolt 202. A washer 204, as best shown in FIG. 4 is also positioned about the shaft of bolt 202 in contact with roller 200, and a coil spring 206 is positioned on the shaft of bolt 202 between the head thereof and washer 204 so as to exert a force on tensioning roller 200. In this regard, it will be appreciated that, as bolt 202 is tightened, the more coil spring 206 is compressed, whereby coil spring 206 exerts a resistance force to turning on tensioning roller 200. As will be described hereinafter, banding strap 26 extends over roller 200. Therefore, a greater resistance to turning can be applied to roller 200 to vary the tension force necessary for banding strap 26 to bias actuating lever 186 in the counter-clockwise direction, and to thereby vary the resistance force of tensioning unit 24a.

In addition, a through bore 208 extends vertically through actuating lever 186 at a position between pad block 194 and tensioning roller 200. Through bore 208 is threaded and threadedly receives a hollow allen screw 210 therein. Allen screw 210 is open at its lower end and has a pin 214 slidable therein and partially extending through the open lower end thereof. A coil spring 216 is positioned about pin 214, in a conventional manner, so as to normally bias pin 214 partially out of the lower open end of allen screw 210. The spring force on pin 214 can therefore be varied by adjusting allen screw 210.

In addition, as shown, two guide rollers 218 and 220 are rotatably mounted to the leftmost portion of horizontal plate 148 by bolts 222 and 224, respectively such that guide rollers 218 and 220 are in line in the longitudinal direction of horizontal plate 148.

Accordingly, as shown in FIGS. 4, 5 and 5A, banding strap 26 extends under stationery guide roller 158, over guide roller 190, between pads 192 and 198, under guide roller 166, over tensioning roller 200 and under guide rollers 218 and 220.

During normal operation, with a required tension applied to banding strap 26, banding strap 26 pivots actuating lever 186 in the counter-clockwise direction to the position shown in FIG. 5A. In such position, the free end of actuating lever 186 hits against pivoting portion 168 of switch lever 162 so as to bias switch lever 162 in the counter-clockwise direction shown by arrow 184 in FIG. 5A. As such, switch actuating rod 176 biases switch arm 180 upwardly so as to close switch 178 and thereby permit operation to continue. Thus, when banding strap 26 is withdrawn, as previously discussed, banding strap 26 is pulled through pads 192 and 198 which are in contact with each other and apply a slight resistance force to the pulling action in order to maintain such tension. Further, it will be noted that the amount of tension needed to bias switch lever 162 to the position shown in FIG. 5A can be varied two ways. First, allen screw 210 can be rotated to either increase or decrease the pressure on spring 216. With an increased pressure on spring 216, there is an increased force on lever portion 170 of switch lever 162 when actuating lever 186 is in contact with switch lever 162, thereby making it more difficult to bias switch lever 162 in the counter-clockwise direction of arrow 184. Secondly, adjustment can be made by tightening or loosening bolt 202. When tensioning bolt 202 is tightened, coil spring 206 is compressed, thereby making it more difficult for tensioning roller 200 to rotate, and thereby requiring less of a tension force on banding strap 26 to rotate actuating lever 186 in the counter-clockwise direction.

It will therefore be appreciated that, with the above mentioned apparatus, appropriate tension is maintained by the tensioning units on banding straps 26 and 36 when elevator mechanism 14 is moved vertically with a stack of envelopes 12.

As discussed above, as elevator mechanism 14 moves the stack of envelopes 12 upwardly through opening 22, stack of envelopes 12 abuts against and biases banding straps 26 and 36 upwardly, thereby pulling additional banding strap material from reels 28a, 28b, 38a and 38b. As elevator mechanism 14 continues moving upwardly, banding straps 26 and 36 are thereby draped over and extend along the sides of stack of envelopes 12 as shown, for example, in FIG. 10. It is thus necessary to seal opposite ends of banding straps 26 and 36 about stack of envelopes 12 and then cut the banding straps for use with the next stack of envelopes. In this regard, sealing and separating units are provided. Specifically, there is a first pair of sealing and separating units 226a and 226b extending in the lengthwise direction and a second pair of sealing and separating units 228a and 228b extending in the widthwise direction, with the pair of sealing and separating units 226a and 226b being identical to sealing and separating units 228a and 228b.

As shown in FIGS. 6, 7 and 8, each sealing and separating unit includes a main body 230 fixed on a carriage 232. An upper pivot arm 234 is pivotally mounted by a pivot pin 236 at the front of main body 230 and a lower pivot arm 238 is pivotally mounted at the lower end of the front of main body 230 by means of a pivot pin 240. Upper pivot arm 234 and lower pivot arm 238 are biased by torsion springs 242 and 244 wrapped about upper pivot pin 236 and lower pivot pin 240, respectively, so as to bias upper pivot arm 234 and lower pivot arm 238 to the outward position shown in FIG. 7. Further, the free end of upper pivot arm 234 includes a pin 246 which carries a toothed roller 248 fixed thereon. In like manner, the free end of lower pivot arm 238 has a pin 250 which carries a toothed roller 252 thereon.

Figure 10:
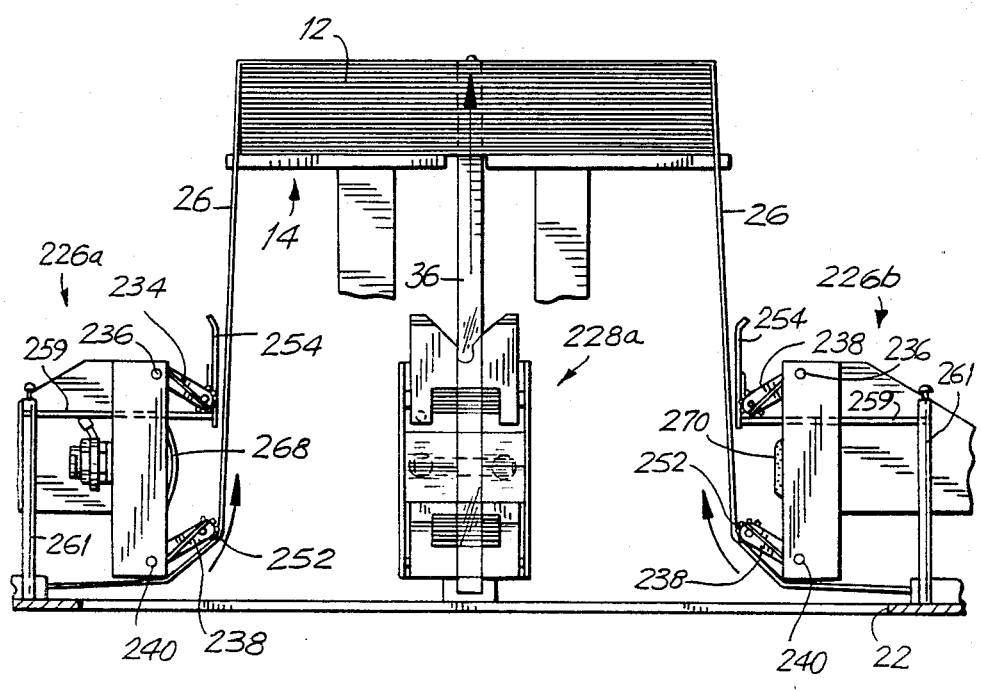
FIG. 10 is a cross-sectional view of the assembly of FIG. 9, taken along line 10—10 thereof.

In addition, an M-shaped guide plate 254 is pivotally mounted on pin 246 in surrounding relation to toothed roller 248 thereon. Torsion springs 256 provided on pin 246 normally bias guide plate 254 to the position shown in FIG. 15. It will be appreciated that the upper end of guide plate 254 is formed with a V-shaped notch 258 which terminates at the center thereof in a substantially semicircular opening 260. Accordingly, when elevator mechanism 14 is moved to the position shown in FIG. 15, and the sealing and separating units are moved inwardly toward each other, the M-shaped guide plates 254 will have an orientation shown in FIG. 15 to better guide the banding strap 26 or 36 therealong and within V-shaped notches 258 and semi-circular openings 260. On the other hand, when the sealing and separating units are moved to their home or separated positions, as shown in FIGS. 7 and 10, a horizontal stop pin 259 secured to the upper end of a stationary post 261 hits against the lower end of each respective M-shaped guide plate 254 to rotate the same about pivot pin 246 against the force of torsion springs 256. The reason for this is to provide a maximum area so as to permit elevator mechanism 14 to travel therethrough.

Figure 13:
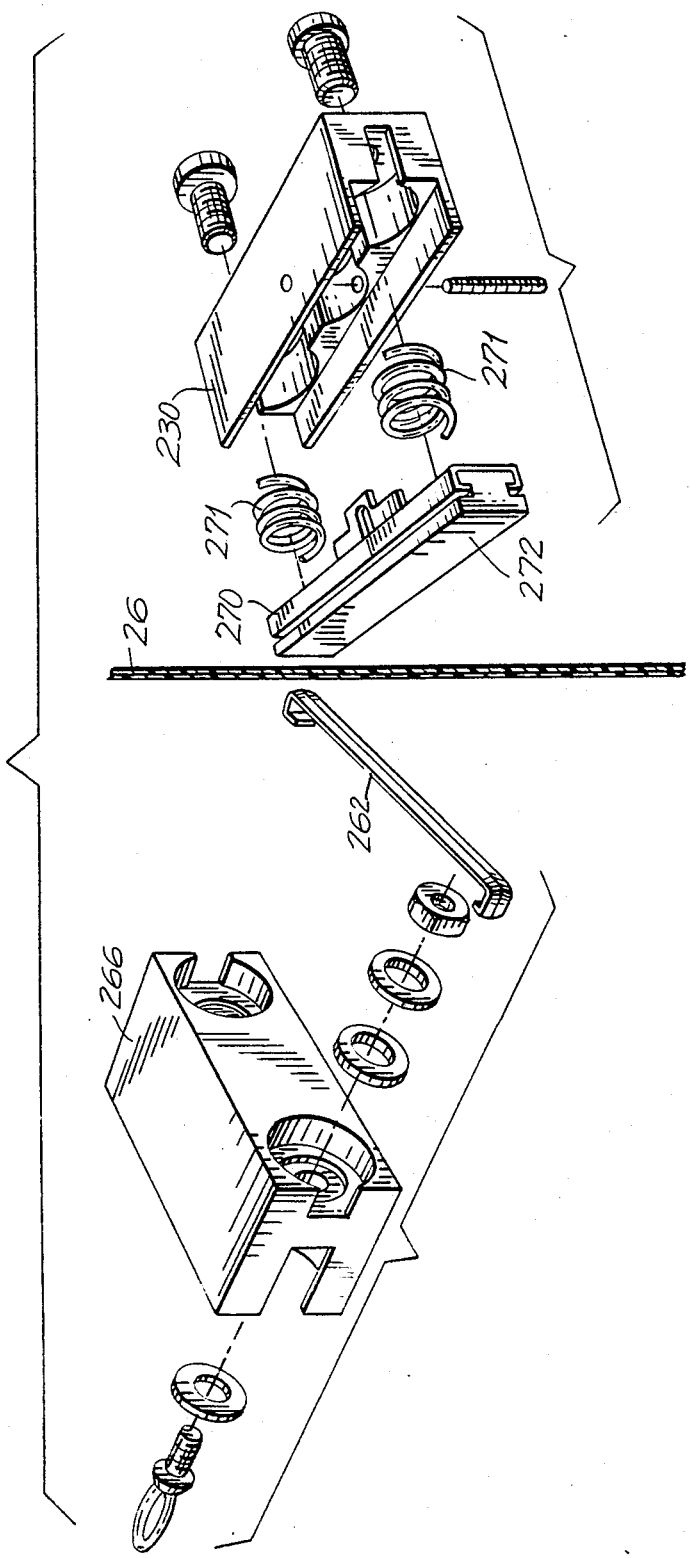
FIG. 13 is an exploded perspective view of a portion of the assembly of FIG. 12.

Further, sealing and separating units 226a and 228a are each provided with a heating element 262, as best shown in FIG. 13, in the form of a nichrome ribbon with a tapered front section, and which is mounted on a block 266 on main body 230. A "Teflon" sheet 268 is secured to main body 230 in surrounding and taut relation to heating element 262 and block 266 so as to be in contact with heating element 262. In such case, it will be appreciated that heating element 262 extends forwardly of block 266 so that "Teflon" sheet 268 assumes a somewhat arcuate configuration. In like manner, sealing and separating units 226b and 228b are each provided with a block 270 presenting a forwardly facing flat surface 272 which extends forwardly of, and is spring biased by springs 271 from, main body 230. As will be described hereinafter, banding strap 26 is clamped between "Teflon" sheet 268 and block 270 and heated and sealed thereat. Of course, it will be appreciated that other means for sealing can be provided, such as the use of radio frequency (RF) waves and the like.

It will be appreciated, particularly from FIG. 3, that lengthwise sealing and separating units 226a and 226b are positioned directly over banding strap 26 and move toward and away from each other. In like manner, sealing and separating units 228a and 228b are positioned over banding strap 36 and move toward and away from each other.

In basic operation, as elevator mechanism 14 moves stack of envelopes 12 from the position shown in FIG. 7 to the position shown in FIG. 10, banding straps 26 and 36 are draped over stack of envelopes 12. In such case, banding strap 26 extends under and is in contact with toothed rollers 252 of sealing and separating units 226a and 226b, while banding strap 36 extends under and is in contact with toothed rollers 252 of sealing and separating units 228a and 228b. Because of the tension on banding straps 26 and 36, lower pivot arms 238 are thereby biased upwardly slightly against the force of torsion springs 244.

Then, sealing and separating units 226a and 226b are caused to move toward each other from the position shown in FIG. 10 to the position shown in FIG. 12. In such position, toothed rollers 248 of sealing and separating units 226a and 226b clamp banding strap 26 therebetween, and toothed rollers 252 of sealing and separating units 226a and 226b clamp a lower portion of banding strap 26 therebetween. Upon continued movement of sealing and separating units 226a and 226b toward each other, upper and lower pivot arms 234 and 238 are rotated inwardly toward the respective main body 230 until banding strap 26 therebetween is clamped between "Teflon" sheet 268 and elastomeric rubber block 270, as shown in FIG. 13. In such case, the portion of banding strap 26 clamped between "Teflon" sheet 268 and block 270 is heated so that opposite ends of banding strap 26 are sealed together. Further, because of the pressure applied by the pointed end of heating element 262 and the greater heater available thereat than at other portions of "Teflon" sheet 268, there results a thinning out at a localized area, as shown in FIG. 13A, to form a localized heating area 274 of banding strap 26.

It will be appreciated that during such clamping, heating and sealing operations by sealing and separating units 226a and 226b, elevator mechanism 14 is stationary at the position shown in FIG. 12. However, because of the inward movement of the sealing and separating units, even greater tension is applied to banding strap 26.

Therefore, after the opposite ends of banding strap 26 have been sealed together, as shown in FIG. 13 and 13A, sealing and separating units 226a and 226b move away from each other so as to release banding strap 26. Because of the tension applied on banding strap 26 due to the vertical raised position of elevator mechanism 14, localized heating area 274 breaks, as shown in FIG. 13B, whereby the portion of banding strap 26 above localized heating area 274 forms a sealed area 276 and the portion of banding strap 26 below localized heating area 274 forms a sealed area 278. Because of the raised position of elevator mechanism 14 and in view of the tensioned nature of banding strap 26 about stack of envelopes 12, the upper separated portion of banding strap 26 with sealed area 276 snaps upwardly so as to form a continuous longitudinal band 280 about stack of envelopes 12 which extends in the longitudinal gap 44 between platform sections 42a–42d.

It will be appreciated, from the above discussion, that sealing and separating unit 226a, when moved inwardly, travels through side opening 50 between support posts 46 that support platform sections 42a and 42d, while sealing and separating unit 226b travels through side opening 50 between vertical support posts 46 that support platform sections 42b and 42c. Thereafter, the lower portion of banding strap 26 with sealed area 278 once more assumes the configuration shown in FIG. 3, shown in enlarged scale in FIG. 15A. The same operation is then performed with sealing and separating units 228a and 228b so as to form a continuous transverse band 282 about stack of envelopes 12. In such case, sealing and separating units 228a and 228b travel through the remaining side openings 50 of elevator mechanism 14.

The apparatus for moving the sealing and separating units toward and away from each other will now be described.

As shown in the drawings, the carriage 232 of each sealing and separating unit includes a first substantially triangular plate 284 secured to the rear face of main body 230, a connecting plate 286 secured transversely to triangular plate 284 and a sliding block 288 secured to the opposite free end of connecting plate 286. For movement of sealing and separating units 226a and 226b, a long beam 290 is provided which extends substantially parallel to banding strap 26 and includes a guide bar 292 at the front face thereof. Sliding block 288 of sealing and separating units 226a is formed at a rear face thereof with stationery pincer type jaws 294 at the upper and lower ends thereof which are in facing arrangement to each other and which engage upper and lower grooves 296 extending along guide bar 292. Accordingly, sliding block 288 is mounted to guide bar 292 for sliding movement therealong.

An A.C. synchronous stepping motor 298 having braking ability is secured to long beam 290 and is connected through suitable gearing 300 to a drive pulley or drum 302 at one end of long beam 290. Guide pulleys 303 and 304 are provided at the opposite end of long beam 290 and endless cable 306 is wound between pulleys 303 and 304 and is driven by drive pulley 302. Specifically, cable 306 extends about guide pulleys 303 and 304 and is wrapped about drive pulley 302 so as to be driven thereby. A single revolution clutch may be used as required. A suitable connection 308 of carriage 232 of sealing and separating unit 226a extends to the rear of long beam 290 and is connected to the upper parallel portion of cable 306, while a connection 310 of carriage 232 of sealing and separating unit 226b extends to the rear of long beam 290 and is connected to the bottom parallel portion of cable 306. Thus, as cable 306 is caused to rotate, for example, in the counter-clockwise direction of FIG. 19, sealing and separating unit 226a is caused to move inwardly of long beam 290 and, at the same time, sealing and separating unit 226b is caused to also move inwardly of long beam 290. For clockwise movement of cable 306 in FIG. 19, sealing and separating units 226a and 226b are cause to move away from each other.

In like manner, the carriages 232 of sealing and separating units 228a and 228b are constructed in an identical manner to those of sealing and separating units 226a and 226b and are thereby connected in the same manner to a guide bar 314 of a short beam 316 which extends substantially transverse to long beam 290, as shown in FIGS. 3, 20, 21, 26 and 27. In this manner, sealing and separating units 228a and 228b can slide along short beam 316. Accordingly, a step motor 312 associated with short beam 316 is connected through suitable pulleys and belts, to be described later, to a drive pulley or drum 328 near the center of short beam 316. Guide pulleys 318 and 320 are rotatably mounted at the opposite end of short beam 316 and a drive cable 322 is wound about pulleys 318 and 320, and wrapped about drive pulley 328.

Specifically, as shown in FIGS. 21 and 29, drive cable 322 is wound about pulley 318 and has one end secured to a cable support 470 of a drive support 456. The opposite end of cable 322 extends from pulley 318, and about pulley 320 to a cable tensioning mechanism 490 which is best shown in FIGS. 21 and 29.

Basically, cable tensioning mechanism 490 includes an L-shaped plate 492 having a first leg 492a and a second leg 492b. An aperture 494 is provided in second leg 492b with a pin 496 slidable through aperture 494. Pin 496 has an enlarged head 498 at the opposite end thereof so as to prevent escape of pin 496 through aperture 494. Pin 496 and enlarged head 498 have a longitudinal bore 500 extending therethrough, such that drive cable 322 extends therethrough and can be tied in a knot at the free end thereof, as at 502. A coil spring 504 is wrapped about pin 496 and extends between enlarged head 498 and horizontal leg 492b so as to normally bias pin 496 away from horizontal leg 492b. Accordingly, cable tensioning mechanism 490 tends to take up any slack in drive cable 322 and thereby maintain the latter in a taut condition.

In a manner similar to that aforedescribed with respect to sealing and separating units 226a and 226b, sealing and separating unit 228a is connected to the upper parallel portion of cable 322, while sealing and separating unit 228b is connected to the lower parallel portion of cable 322. In this manner, sealing and separating units 228a and 228b can be moved simultaneously toward and away from each other upon rotation of drive pulley 328.

It will be appreciated that, as previously described, pulley 84 of the elevator drive and pulleys 108 and 112 of counterweight assembly 106 are rotatably mounted on short beam 316. It will further be appreciated that cable 72 is connected to the lower portion of elevator mechanism 14 such that, when elevator drive support 56 is moved to a position near pulley 84, elevator platform 42 is at a much higher position which is the uppermost position of elevator mechanism 14.

As shown in FIGS. 21 and 24–27, motor 312 has a pulley 324 connected to its output shaft 326. Motor 312 is mounted to short beam 316. As discussed above, drive pulley 328 is mounted to the lower end of short beam 316 and cable 322 is wound numerous times thereabout in its traverse between pulleys 318 and 320. A belt 330 connects pulley 324 with another pulley 329 that is rotatably coupled with drive pulley 328. Accordingly, motor 312, through pulley 324, belt 330 and pulley 329, causes rotation of drive pulley 328 and thereby movement of drive cable 322 to move sealing and separating units 228a and 228b toward and away from each other.

Numerous switches are associated with the present invention, and particularly, with vertical beam 76, long beam 290 and short beam 316. First, with respect to vertical beam 76, as shown in FIG. 22, there is a first lower switch 332 which detects the lowermost position of elevator mechanism 14. Accordingly, when elevator mechanism 14 returns to its lowermost position, switch 332 is activated in order to supply another stack of envelopes 12 on elevator platfrom 42. Thereafter, elevator mechanism 14 is activated to move upwardly. The next uppermost switch is switch 334 which activates the banding operation in which sealing and separating units 226a, 226b, 228a and 228b are caused to move toward and away from each other when the elevator mechanism 14 is stopped at this position in order to band the stack of envelopes 12 thereon. The next switch 336 at the upper end of vertical beam 76 stops elevator mechanism 14 at its upper end after it has tilted. Thereafter, after a predetermined delay amount of time, elevator mechanism 14 automatically descends to its lowermost position. Each of switches 332, 334 and 336 has a switch arm 338 which is activated by a switch actuator 340 (FIGS. 16 and 17A) at the free end of cable support 70.

As shown in FIG. 19, switches 342 and 344 on long beam 290 are home switches which indicate when sealing and separating units 226a and 226b are separated from each other to a maximum extent. On the other hand, switches 346 and 348 are sealing switches which indicate when sealing and separating units 226a and 226b are in the position shown in FIG. 13. Accordingly, in view of these positions and in view of respective timings applied, control of movement of sealing and separating units 226a and 226b can be effected.

In like manner, and referring to FIGS. 20 and 21, switch 350 is a home switch which indicates when sealing and separating units 228a and 228b are in their maximum separated position whereas switches 352 and 354 are sealing switches which indicate when sealing and separating units 228a and 228b are in sealing relation, as shown in FIG. 13.

It will therefore be appreciated from the above description that apparatus 10 according to the present invention provides an automatic and easy way of banding a stack of envelopes together. Since the banding straps are elastic and resilient, and are cut or separated in accordance with the size of the envelopes, there is no biting at the edges of the bundled envelopes. Further, the amount of time necessary to bundle the stack of envelopes is greatly reduced.

It will further be appreciated that while the present invention has been described with respect to a stack of envelopes, it could easily be applied to other articles, such as money, coupons and the like that needs to be bundled. Further, such articles need not be paper articles, but could be packages and the like.

Having described a specific preferred embodiment of the invention with reference to the accompanying drawings, it will be appreciated that the present invention is not limited to that precise embodiment, and that various changes and modifications may be effected therein by one of ordinary skill in the art without departing from the scope or spirit of the invention as defined in the appended claims.

What is claimed is:

1. Apparatus for banding a stack of articles, comprising:

elevator means for moving said stack of articles in a path from a first position to a second position;

first tensioning means for applying a tensioning force to a first banding strap positioned across said path at a first location between said first and second positions and extending in a first direction;

first sealing and separating means for wrapping, sealing and separating opposite ends of said first elastic banding strap about said stack of articles when said elevator means has moved said stack of articles past said first location;

second tensioning means for applying a tensioning force to a second elastic banding strap positioned across said path at a second location between said first and second positions and extending in a second direction substantially transverse to said first direction; and second sealing and separating means for wrapping, sealing and separating opposite ends of said second elastic banding strap about said stack of articles when said elevator means has moved said stack of articles past said second location.

2. Apparatus according to claim 1; wherein said elevator means includes elevator platform means for supporting said stack of articles thereon, support means for supporting said elevator platform means, and elevator drive means connected with said support means for moving said elevator platform means between said first and second positions.

3. Apparatus according to claim 2; wherein said elevator platform means includes a plurality of platform sections separated from each other so as to form gaps therebetween in said first and second directions in order to permit said first and second banding straps to pass therethrough, and said support means includes a plurality of posts, each supporting a platform section thereon.

4. Apparatus according to claim 2; wherein said support means includes at least one arm, and said elevator drive means includes pivot support means pivotally connected with said at least one arm for pivotally mounting said support means and said elevator platform means on said elevator drive means.

5. Apparatus according to claim 4; wherein said at least one arm includes a cantilevered extension, and said apparatus further includes stationary projection means, at an upper end thereof against which said extension abuts when said elevator means moves to said second position, for tipping said elevator means to remove the stack of articles which has been banded by said first and second banding straps from said elevator platform means.

6. Apparatus according to claim 5; wherein said cantilevered extension has a free end, and said at least one arm further includes cam means at the free end of said extension for abutting against said stationary projection means when said elevator means moves to said second position so as to tip said elevator means to remove the stack of articles which has been banded by said first and second banding straps from said elevator platform means.

7. Apparatus according to claim 2; wherein said elevator drive means includes an elevator drive support connected with said support means, lift cable means connected with said elevator drive support and motor means for driving said lift cable means to move said elevator platform means between said first and second positions.

8. Apparatus according to claim 7; wherein said elevator drive means further includes guide pulley means for supporting said lift cable means and drive pulley means connected with said motor means and about which said lift cable means is wrapped for driving said lift cable means.

9. Apparatus according to claim 7; wherein said elevator drive means further includes counterweight means connected with said elevator drive support for applying a counterweight force corresponding to the weight of said elevator platform means and said support means.

10. Apparatus according to claim 9; wherein said counterweight means includes a tensioning cable having one end secured to said elevator drive support, pulley means for supporting said tensioning cable and biasing means connected with the opposite end of said tensioning cable for applying said counterweight force to said tensioning cable.

11. Apparatus according to claim 1; wherein said first tensioning means includes a first tensioning unit and a second tensioning unit in opposition to said first tensioning unit, said first and second tensioning units extending in said first direction such that the first banding strap is tensioned therebetween.

12. Apparatus according to claim 11; wherein each of said first and second tensioning units includes switch means for indicating when there is sufficient tension on said first banding strap, first lever means for actuating said switch means when there is sufficient tension on said first banding strap, and second lever means for actuating said first lever means when there is sufficient tension on said first banding strap such that said second lever means actuates said switch means.

13. Apparatus according to claim 12; wherein said first and second lever means each include guide means about which said first banding strap travels.

14. Apparatus according to claim 13; wherein said second lever means includes means for adjusting the tension on said first banding strap means.

15. Apparatus according to claim 14; wherein said means for adjusting the tension includes roller means rotatably mounted on said second lever means, and adjustable biasing means for applying a desired rotation resisting force on said roller means.

16. Apparatus according to claim 11; wherein said second tensioning means includes a third tensioning unit and a fourth tensioning unit in opposition to said third tensioning unit, said third and fourth tensioning units extending in said second direction such that the second banding strap is tensioned therebetween.

17. Apparatus according to claim 16; wherein each of said third and fourth tensioning units includes second switch means for indicating when there is sufficient tension on said second banding strap, third lever means for actuating said second switch means when there is insufficient tension on said second banding strap, and fourth lever means for actuating said third lever means when there is sufficient tension on said second banding strap such that said third lever means actuates said second switch means.

18. Apparatus according to claim 17; wherein said third and fourth lever means each include second guide means about wich said second banding strap travels.

19. Apparatus according to claim 18: wherein said fourth lever means includes second means for adjusting the tension on said second banding strap means.

20. Apparatus according to claim 19; wherein said second means for adjusting the tension includes second roller means rotatably mounted on said fourth lever means, and second adjustable biasing means for applying a desired rotation resisting force on said second roller means.

21. Apparatus according to claim 1; wherein said first sealing and separating means includes a first sealing and separating unit and a second sealing and separating unit in opposing relation to said first sealing and separating unit, said first and second sealing and separating units being arranged for movement in said first direction immediately above said first banding strap, and means for moving said first and second sealing and separating units toward and away from each other.

22. Apparatus according to claim 21; wherein each of said first and second sealing and separating units includes:
a main body,
a lower arm pivotally secured to a lower portion of said main body such that said lower arms of said first and second sealing and separating units clamp said first banding strap therebetween when said first and second sealing and separating units are moved toward each other, and an upper arm pivotally secured to an upper portion of said main body such that said upper arms of said first and second sealing and separating units clamp said first banding strap therebetween when said first and second sealing and separating units are moved toward each other.

23. Apparatus according to claim 22; wherein said first sealing and separating unit includes sealing means mounted to said main body between said upper and lower arms thereof, and said second sealing and separating unit includes block means mounted to said main body between said upper and lower arms thereof, such that said sealing means and said block means clamp and seal said first banding strap therebetween when said first and second sealing and separating units are moved toward each other.

24. Apparatus according to claim 23; wherein said sealing means including a heating block.

25. Apparatus according to claim 22; wherein each of said first and second sealing and separating units includes a first pin at the free end of said upper arm and a first toothed roller fixedly mounted on said first pin such that said first toothed rollers of said first and second sealing and separating units clamp said first banding strap therebetween when said first and second sealing and separating units are moved toward each other, and a second pin at the free end of said lower arm and a second toothed roller fixedly mounted on said second pin such that said second toothed rollers of said first and second sealing and separating units clamp said first banding strap therebetween when said first and second sealing and separating units are moved toward each other, thereby releasing tension in the banding straps for sealing.

26. Apparatus according to claim 25; wherein each of said first and second sealing and separating units includes a guide plate pivotally mounted on said first pin in surrounding relation to said first toothed roller thereon, each guide plate including a notched portion for guiding said first banding strap.

27. Apparatus according to claim 21; wherein said means for moving includes a long beam extending in said first direction; cable means secured to said first and second sealing and separating units for moving said first and second sealing and separating units toward and away from each other; pulley means mounted on said long beam for supporting said cable means thereon for movement therealong; and drive means connected with said cable means for moving said cable means.

28. Apparatus according to claim 27, wherein said drive means includes drum means about which said cable means is wound for moving said cable means upon rotation of said drum means; and motor means for rotatably driving said drum means.

29. Apparatus according to claim 1; wherein said second sealing and separating means includes a first sealing and separating unit and a second sealing and separating unit in opposing relation to said first sealing and separating unit, said first and second sealing and separating units being arranged for movement in said second direction immediately above said second banding strap, and means for moving said first and second sealing and separating units toward and away from each other.

30. Apparatus according to claim 29; wherein each of said first and second sealing and separating units includes:

a main body, a lower arm pivotally secured to a lower portion of said main body such that said lower arms of said first and second sealing and separating units clamp said second banding strap therebetween when said first and second sealing and separating units are moved toward each other, and an upper arm pivotally secured to an upper portion of said main body such that said upper arms of said first and second sealing and separating units clamp said second banding strap therebetween when said first and second sealing and separating units are moved toward each other.

31. Apparatus according to claim 30; wherein said first sealing and separating unit includes sealing means mounted to said main body between said upper and lower arms thereof, and said second sealing and separating unit includes block means mounted to said main body between said upper and lower arms thereof, such that said sealing means and said block means clamp and seal said second banding strap therebetween when said first and second sealing and separating units are moved toward each other.

32. Apparatus according to claim 31; wherein said sealing means including a heating block.

33. Apparatus according to claim 31; wherein each of said first and second sealing and separating units includes a first pin at the free end of said upper arm and a first toothed roller rotatably mounted on said first pin such that said first toothed rollers of said first and second sealing and separating units clamp said second banding strap therebetween when said first and second sealing and separating units are moved toward each other, and a second pin at the free end of said lower arm and a second toothed roller rotatably mounted on said second pin such that said second toothed rollers of said first and second sealing and separating units clamp said second banding strap therebetween when said first and second sealing and separating units are moved toward each other.

34. Apparatus according to claim 33; wherein each of said first and second sealing and separating units includes a guide plate pivotally mounted on said first pin in surrounding relation to said first toothed roller thereon, each guide plate including a notched portion for guiding said second banding strap.

35. Apparatus according to claim 29; wherein said means for moving includes a short beam extending in said second direction; cable means secured to said first and second sealing and separating units for moving said first and second sealing and separating units toward and away from each other; pulley means mounted on said short beam for supporting said cable means thereon for movement therealong; and drive means connected with said cable means for moving said cable means.

36. Apparatus according to claim 35; wherein said drive means includes drum means about which said cable means is wound for moving said cable means upon rotation of said drum means; and motor means for rotatably driving said drum means.

37. Apparatus according to claim 1; further including switch means for indicating when said elevator means in said first position, said second position and at least one intermediate position at which said first and second sealing and separating means wrap, seal and separate said first and second bands about said stack of articles.

* * * * *